United States Patent [19]

Sumio et al.

[11] Patent Number: 5,729,638
[45] Date of Patent: Mar. 17, 1998

[54] DEVICE AND METHOD FOR GENERATING PATTERNS

[75] Inventors: Hiroshi Sumio, Tokyo; Hideto Kohtani, Yokohama, both of Japan

[73] Assignee: Canon Kabushiki Kaisha, Japan

[21] Appl. No.: 363,894

[22] Filed: Dec. 27, 1994

[30] Foreign Application Priority Data

Dec. 28, 1993 [JP] Japan .................................. 5-338190
Dec. 14, 1994 [JP] Japan .................................. 6-310556

[51] Int. Cl.$^6$ .................................................. G06K 9/20
[52] U.S. Cl. .......................... 382/305; 395/786; 382/317
[58] Field of Search ..................................... 382/305, 306, 382/175, 317; 358/403; 395/768, 769, 786

[56] References Cited

U.S. PATENT DOCUMENTS

| | | | |
|---|---|---|---|
| 4,933,984 | 6/1990 | Nakano et al. | 382/175 |
| 5,129,016 | 7/1992 | Murakami et al. | 382/306 |
| 5,222,157 | 6/1993 | Yoneda et al. | 382/306 |
| 5,265,292 | 11/1993 | Fujisawa et al. | 382/305 |
| 5,339,412 | 8/1994 | Fueki | 382/306 |

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

A pattern generating device includes a deciding unit, a registration control unit, and an output unit. The deciding unit decides either that form information in a code data format input externally is registered in a code data format, or that a form pattern which is created from the form information in the code data format is registered, based on form registration designation information. The registration control unit registers the form information into a memory unit when the deciding unit decides that the form information is instructed to register in the code data format, and creates a form pattern from the form information and then registers the same into the memory unit when the deciding unit decides that it is instructed to create the form pattern from the form information and to register the same. The output control unit creates a form pattern based on the form information in the code data format registered in the memory unit, superimposes the form pattern with the output pattern, and then outputs the result, or it superimposes the form information registered in the memory unit with the output pattern and outputs the result, when the output pattern created based on input data input externally is superimposed with the output pattern and the result is outputted.

14 Claims, 15 Drawing Sheets

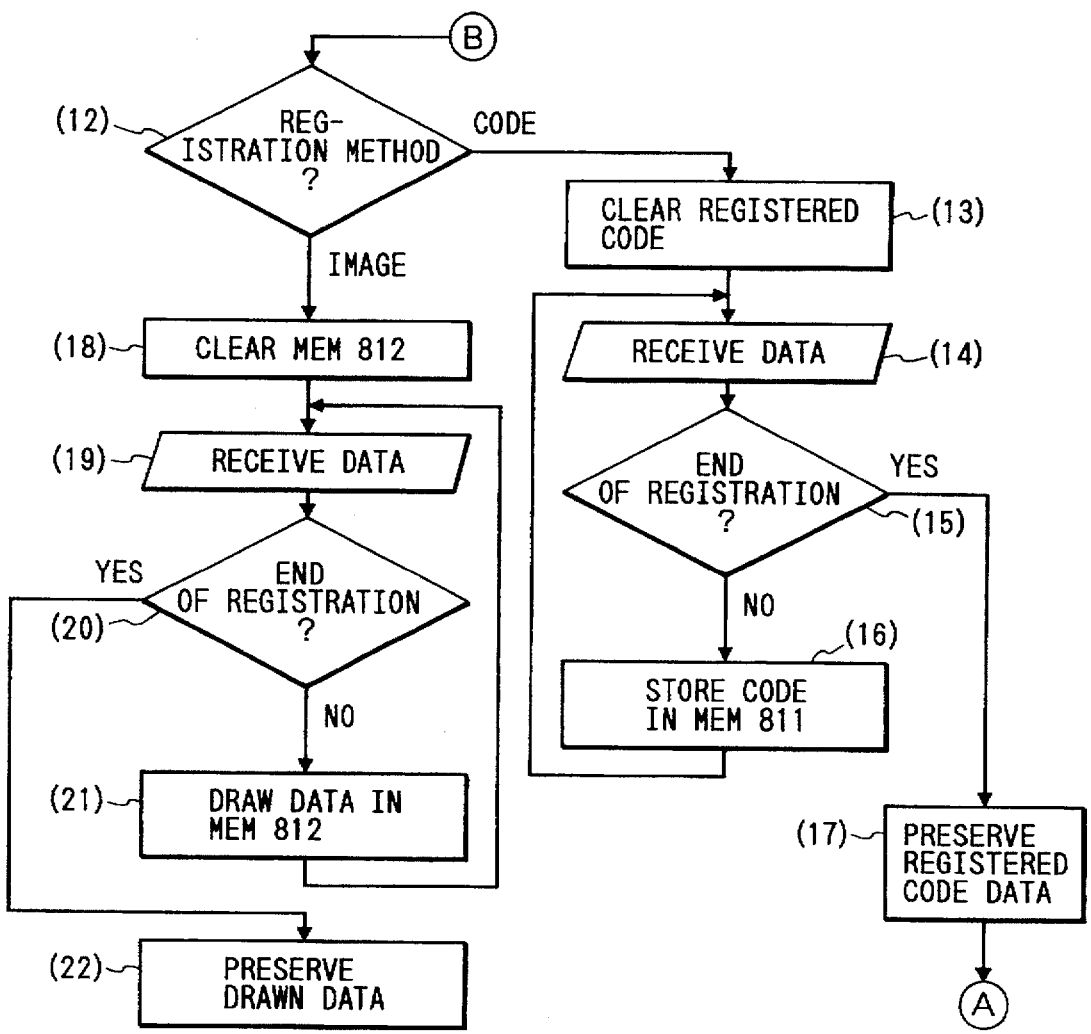

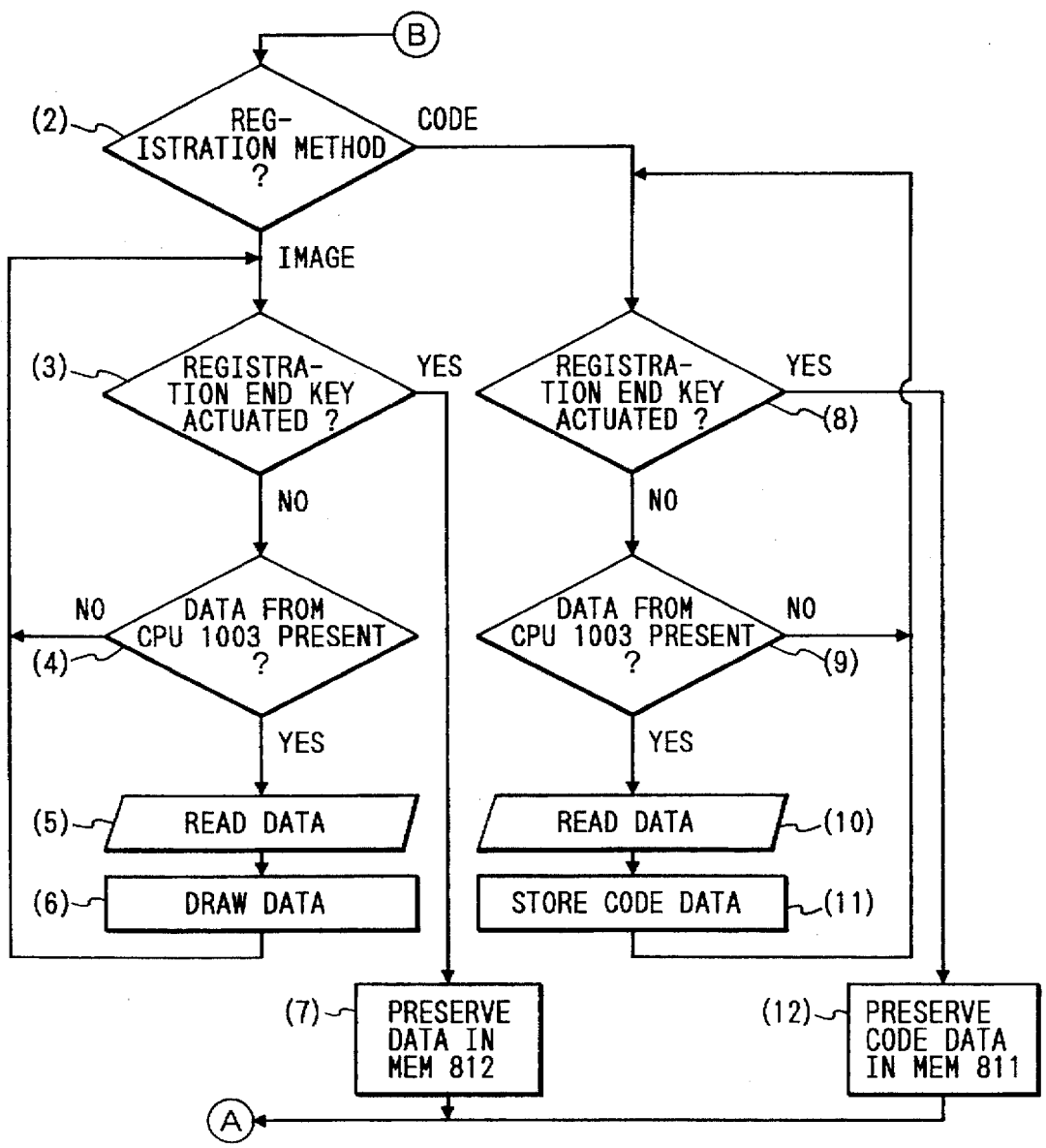

| FIG. 12A | FIG. 12B |

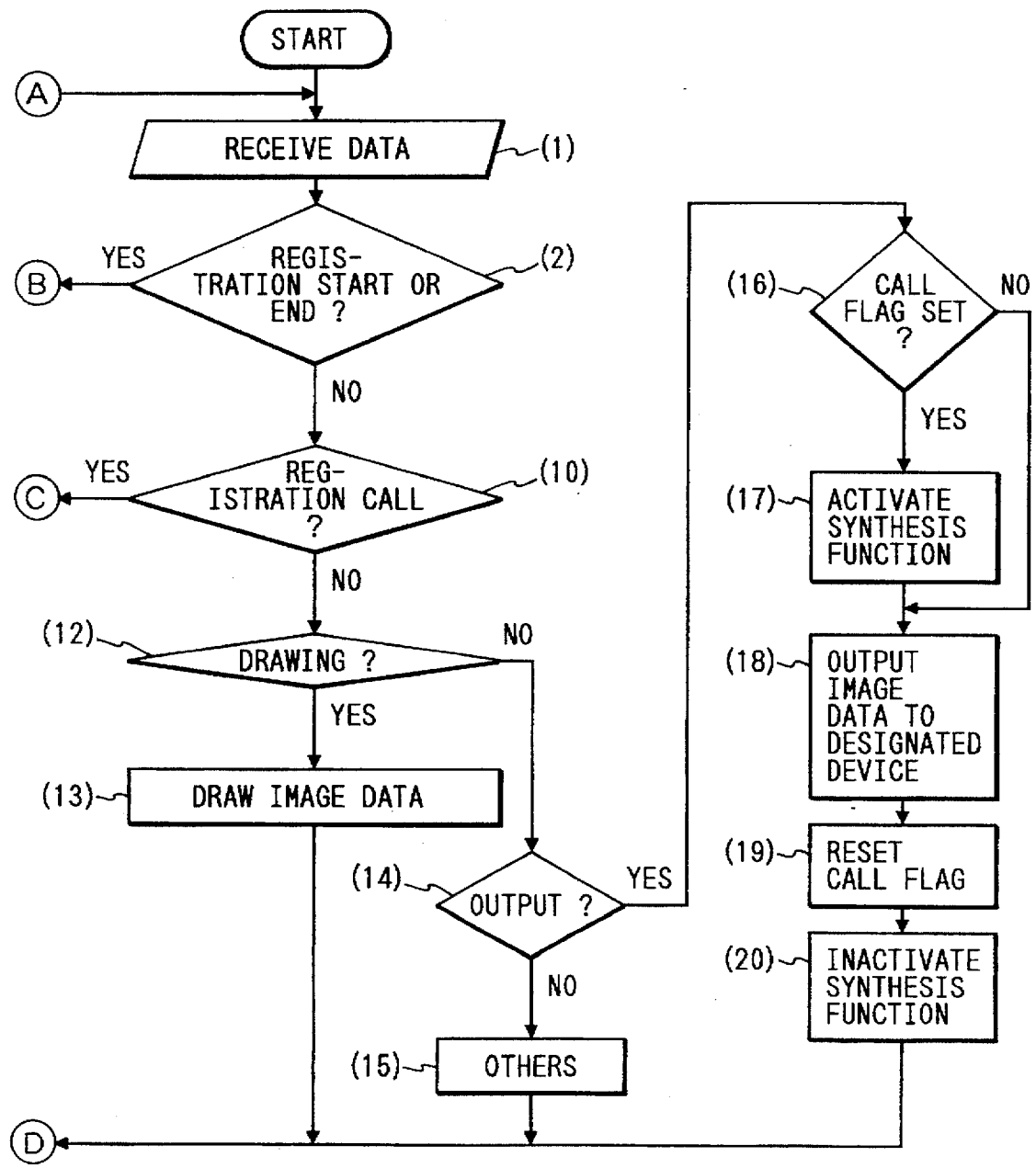

DEVICE AND METHOD FOR GENERATING PATTERNS

BACKGROUND OF THE INVENTION

1. Field of the Invention

The present invention relates to a pattern generating device and a pattern generating method each which produces a composite output of (1) a form pattern and (2) a second, an output pattern. The second output pattern is created based on an input pattern input from an external unit such as a host computer.

2. Related Background Art

Conventionally, command data sent from a host computer is registered or stored in memory in accordance with a data registration command sent from another computer. In order to send data to form a new drawing, the following method is used. If there is a call command for registered data, the registered command data is first translated to form ("draw") an image. Thereafter, image data, such as a drawing, is sent by the host and overlaid with the first-drawn image to form the image of interest. Thus, the image of interest is formed using less time by eliminating the need to repeatedly transfer the registered data for each new drawing that is formed.

This kind of method is applicable to, for example, a laser beam printer.

The conventional method can shorten the transfer time of registered data. However, there is the disadvantage in that forming the drawing takes much more time because the previously registered data must be first translated every time a new image is drawn.

SUMMARY OF THE INVENTION

In order to overcome the foregoing problems, an object of the present invention is to provide an improved pattern generating apparatus with good operability. This apparatus selects and registers the data format of form information or a form pattern according to an operation instruction from an operation unit or a command instruction from a computer unit to analyze the information input externally. The composite output (form overlay pattern output) formed from a created output pattern and converted registered form information or the form pattern can be produced effectively in short time.

A further object of the present invention is to provide an improved pattern generating method which can provide good operability. This method includes the steps of selecting and registering form information in a data format or a form pattern according to an operation instruction from an operation unit or a command instruction from a computer unit to analyze the form input externally. The composite output (form overlay pattern output) is formed from created output pattern and converted registered form information or the form pattern can be formed effectively in short time.

In order to achieve the objects described above, the pattern generating device according to the present invention includes a unit for deciding whether form information in a code data format input externally is to be registered in a code data format, or whether a form pattern which is created from the form information in the code data format is to be registered instead, based on form registration designation information. The device also includes a registration control unit for registering the form information into a memory when the deciding unit decides that the form information is to be registered in the code data format, and for creating a form pattern from the form information and then registering the form pattern into the memory when the deciding unit decides that the form pattern is to be created from the form information and to register the same. The device further includes an output control means for creating a form pattern based on the form information in the code data format registered in the memory means, superimposing the form pattern with a second pattern, and then outputting the result, or superimposing the form pattern registered in the memory unit with the output pattern and outputting the result. The second pattern is created based on externally input data.

The pattern generating method according to the present invention is characterized by deciding whether form information in a code data format input externally is registered in a code data format, or whether a form pattern which is created from the form information in the code data format is registered, based on form registration designation information. The method also includes the step of registering the form information into a memory when it has been decided that the form information is to be registered in the code data format, or creating a form pattern from the form information and then registering the form pattern into the memory when it has been decided instead. The method also includes the step of creating a form pattern based on the form information in the code data format registered in the memory unit, superimposing the form pattern with the second pattern, and then outputting the result, or superimposing the form pattern registered in the memory unit with the second pattern and outputting the result.

DETAILED DESCRIPTION OF THE PREFERRED EMBODIMENTS

An embodiment of the present invention will be explained below with reference to the attached drawings.

Figure 1:
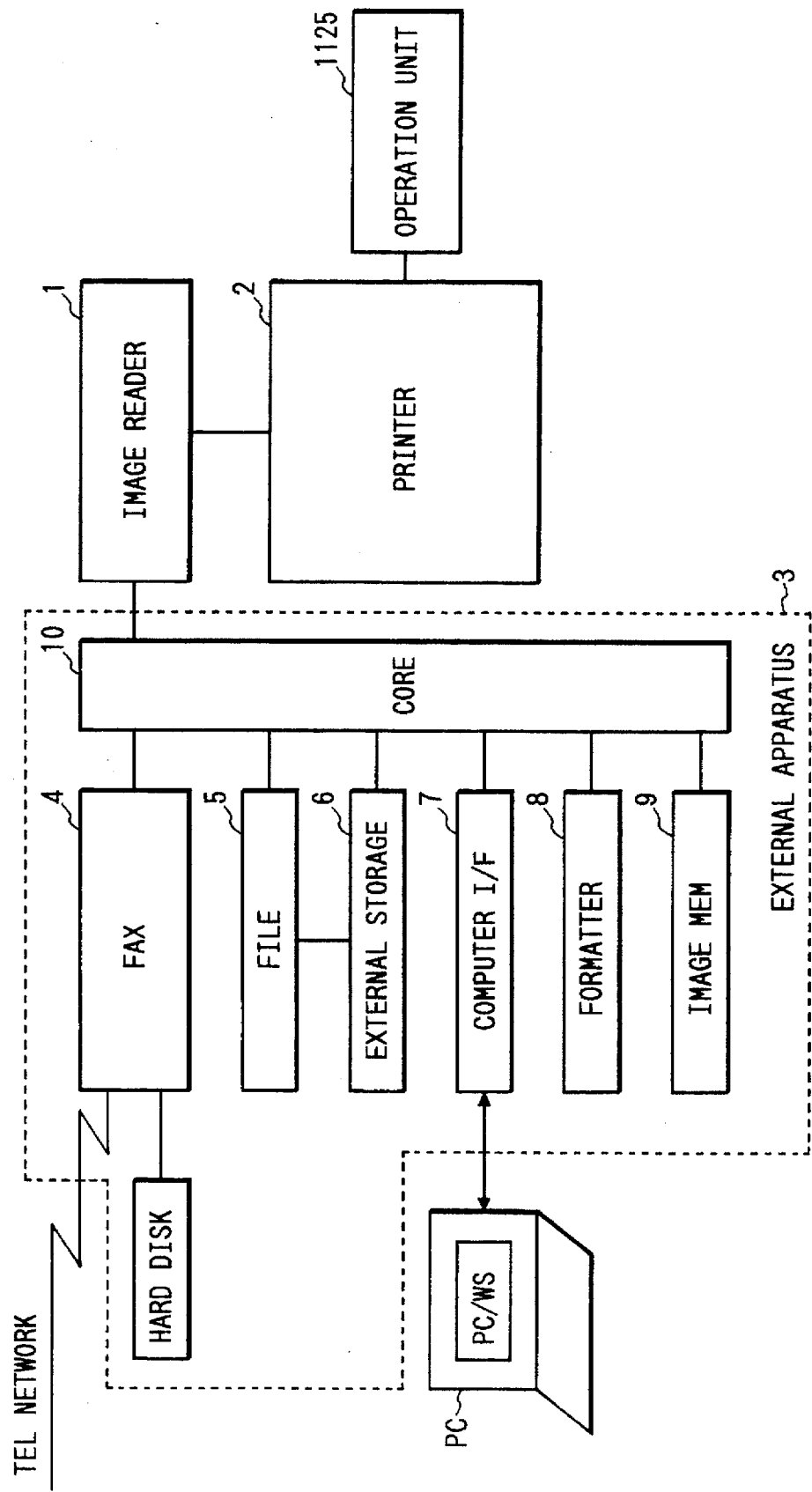
FIG. 1 is a block diagram showing the configuration of an image forming system according to the first embodiment of the present invention.

FIG. 1 is a block diagram showing the configuration of an image forming system according to the present invention.

Referring to FIG. 1, numeral 1 represents an image inputting unit (hereinafter referred to as a reader) for converting a manuscript into image data, 2 represents an image outputting unit (hereinafter referred to as a printer) having plural kinds of recording paper cassettes, for outputting image data as a visible image on a recording paper by means of a print command, and 3 represents an external unit connected electrically to the reader 1 and having various functions. The external unit 3 includes a facsimile unit 4, a file unit 5, or an external storage unit 6 connected to the file unit 5, a computer interface unit 7 for connecting a computer, a formatter 8 for forming a variable image based on information from a computer, an image memory unit 9 which stores information from the reader 1 or stores temporarily information sent from the computer, a core unit 10 for controlling the above-mentioned functions, and similar elements.

In the image forming system described above, based on a command instruction from a computer unit or an operation instruction from the operation unit 1125, the core unit 10 stores either the code data sent from the computer unit PC or image information converted by the formatter unit 8 to the external storage unit 6, in accordance with the procedures of the flow charts shown in FIGS. 10A to 12B (to be described), thus shortening the image-information conversion processing time when an image information is output after the complete a registration.

The formatter unit 8 outputs composite image information to the printer unit. It produces the composite image by selecting an image superimposing method, corresponding to a system processing resource, which superimposes registered image information and image information input externally, in accordance with a command instruction from the computer unit PC or an operation instruction from the operation means. The composite image information is formed by synthesizing either the registered image information or the converted and registered image information, based on code data read out of the external storage unit 6, with conversion image information obtained by analyzing and converting code data sent from the computer unit PC, in accordance with a command instruction from the computer unit PC or the operation instruction from the operation unit 1125.

Figure 2:
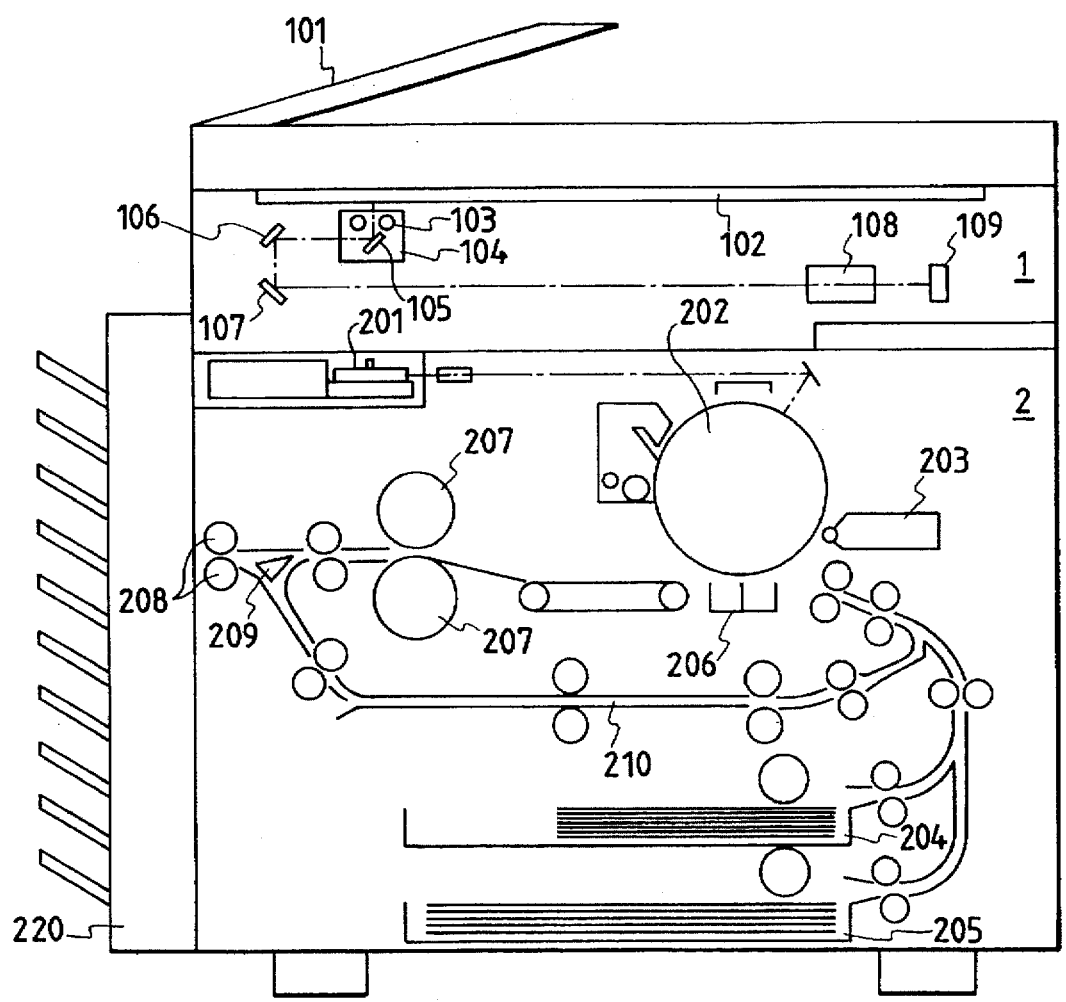
FIG. 2 is a cross-sectional view showing the configuration of the reader and printer shown in FIG. 1.

FIG. 2, is a cross-sectional view showing the configuration of the reader 1 and the printer 2 shown in FIG. 1. Next, the construction and operation will be described below.

Manuscripts piled on the manuscript feeding unit 101 are fed out one by one over the glass surface 102 of the manuscript stage. When a manuscript is transferred, the lamp 103 on the scanner is turned on and the scanner unit 104 travels horizontally to illuminate the manuscript. The light reflected back from the manuscript passes through the lens 108 via the mirrors 105, 106, and 107, and finally enters the CCD image sensor 109 (hereinafter referred to as CCD).

Figure 3:
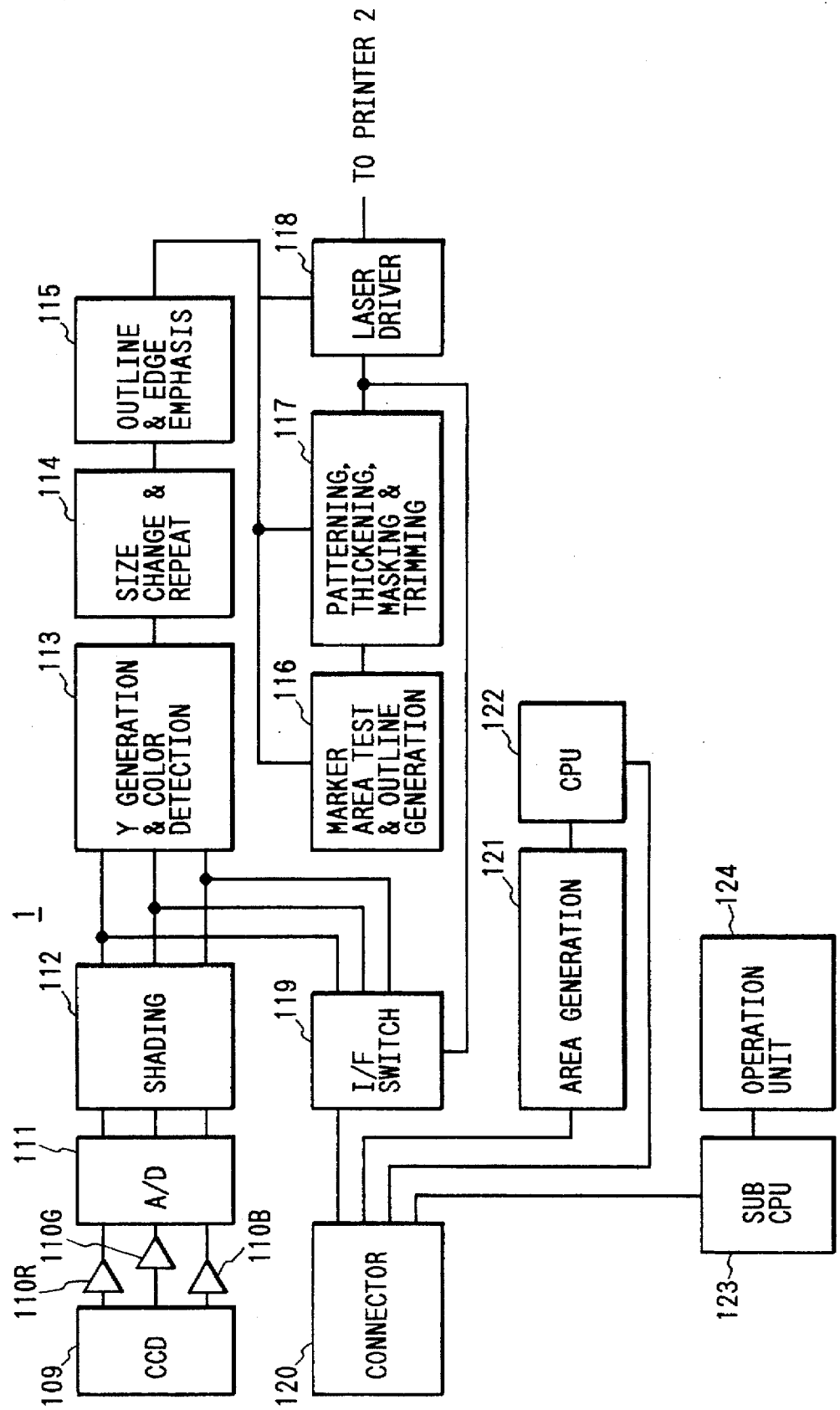
FIG. 3 is a circuit block diagram showing the signal processing configuration of the reader shown in FIG. 2.

FIG. 3 is a circuit block diagram showing the signal processing configuration of the reader 1 shown in FIG. 2. The configuration and operation will be described below.

The CCD 109 receives the image information to convert it into an electrical signal. Next, the amplifiers 110R, 110G, and 110B each amplify the color information from the CCD 109 to the input signal level. The shading circuit 112 receives the output signal from the A/D converter 111 to compensate the fluctuation in distributed light of the lamp 103 and the fluctuation in sensitivity of the CCD. The shading circuit 112 inputs its output signals to the Y-signal and color detection circuit 113 and the external I/F switching circuit 119.

In order to produce a Y-signal, the Y-signal generation and color detection circuit 113 operates the signals from the shading circuit 112 in accordance with the following formula:

$$Y=0.3R+0.6G+0.1B$$

The circuit 113 includes color detection circuits which separate the R, G, and B signals into seven kinds of colors, respectively, and output signals corresponding to respective colors. The size change and repeat circuit 114 receives the output signal from the Y-signal generation and color detection circuit 113. The magnification of the secondary scanning direction is varied in accordance with the scanning rate of the scanner unit 104. The size change circuit and repeat circuit 114 varies the magnification of the main scanning direction. The size change and repeat circuit 114 can output the same images. The outline and edge emphasis circuit 115 underlines the high-frequency components from the size change and repeat circuit 114 to obtain the edge emphasis and outline information. The signal from the outline and edge emphasis circuit 115 is input to the marker area test and outline generation circuit 116 and the patterning, thickening, masking, and trimming circuit 117.

The outline and edge emphasis circuit 116 reads the portion on which a color marker pen designates on a manuscript to obtain the marker outline information. Next, the patterning, thickening, masking, and trimming circuit 117 executes thickening, masking, and trimming operation, based on the outline information. The patterning is performed in accordance with the color detection signal from the Y-signal generation and color detection circuit 113.

The laser driver circuit 118 receives the output signal from the patterning, thickening, masking, and trimming circuit 117 and then converts the variously processed signal into a laser driving signal. The printer 2 receives the output signal from the laser driver 118 to form a variable image. Next, explanation will be made below as to the external I/F switching circuit 119 which interfaces with an external device.

When the reader 1 outputs image information to the external device 3, the external I/F switching circuit 119 outputs the image information from the patterning, thickening, masking, and trimming circuit 117 to the connector 120. When the external device 3 inputs image information to the reader 1, the external switching circuit 119 inputs the image information from the connector 120 to the Y-signal generation and color detection circuit 113.

The above-mentioned image process is performed in accordance with the command from the CPU 122. The area generating circuit 121 produces various timing signals necessary for the image process at a value set by the CPU 122. Moreover, the communication function included in the CPU 122 allows the communication with the external device 3. SUB.CPU 123 controls the operation unit 124 and communicates with the external device 3 using the communication function built in the CPU 123.

[Explanation of the printer 2]

The configuration and operation of the printer unit 2 will be described below with reference to FIG. 2.

The exposure control unit 201 converts a signal input in the printer unit 2 into an optical signal and then illuminates the photosensitive drum 202 in accordance with the image signal. The developer 203 develops a latent image formed on the photosensitive drum due to the illuminated light. The transfer sheet mounting unit 204 or 205 feeds out a sheet of transfer paper in synchronism with the development and timing to transfer a developed image on it with the transfer unit 206. After the developer 207 transfers and fixes the transferred image on the sheet of transfer paper, the paper ejector 208 ejects outside the device. The ejector 208 ejects the transferred paper into each tray when the sorting function of the sorter is in active state, or ejects it into the top tray when the sorting function of the sorter is in inactive state.

Next, explanation will be made below as to the method by which images read in sequentially are formed on both surfaces of a single output paper.

The output paper fixed with the fixer 207 is once fed to the paper ejector 208, and then its paper transfer direction is inverted. Then the paper is transferred to the paper re-supply and non-transferred paper mounting unit 210 via the transfer direction switching unit 209. When the next manuscript is prepared, the manuscript image is read in the same process described above. However, since the paper re-supply and non-transferred paper mounting unit 210 supplies the transfer paper, images corresponding to two manuscripts can be formed on the front and back surfaces of the same output paper.

[Explanation of the external device 3]

The external device 3, which is connected to the reader 1 via a cable, controls signals in the core unit therein and executes various functional controls. The external device 3 includes a facsimile unit 4 for performing facsimile transmitting and receiving, a file unit 5 for converting various manuscript information into electrical signals and preserving the results, an interfacing unit 7 for interfacing the formatter 8 expanding the code information from a computer into image information with a computer, an image memory unit 9 for storing information from the reader unit 1 and for temporarily storing information from the computer, and a core unit 10 for controlling the various functions.

The configuration and operation of the core unit 10 in the external device 3 will be described below with reference to the block diagram shown in FIG. 4.

[Explanation of the core unit 10]

Figure 4:
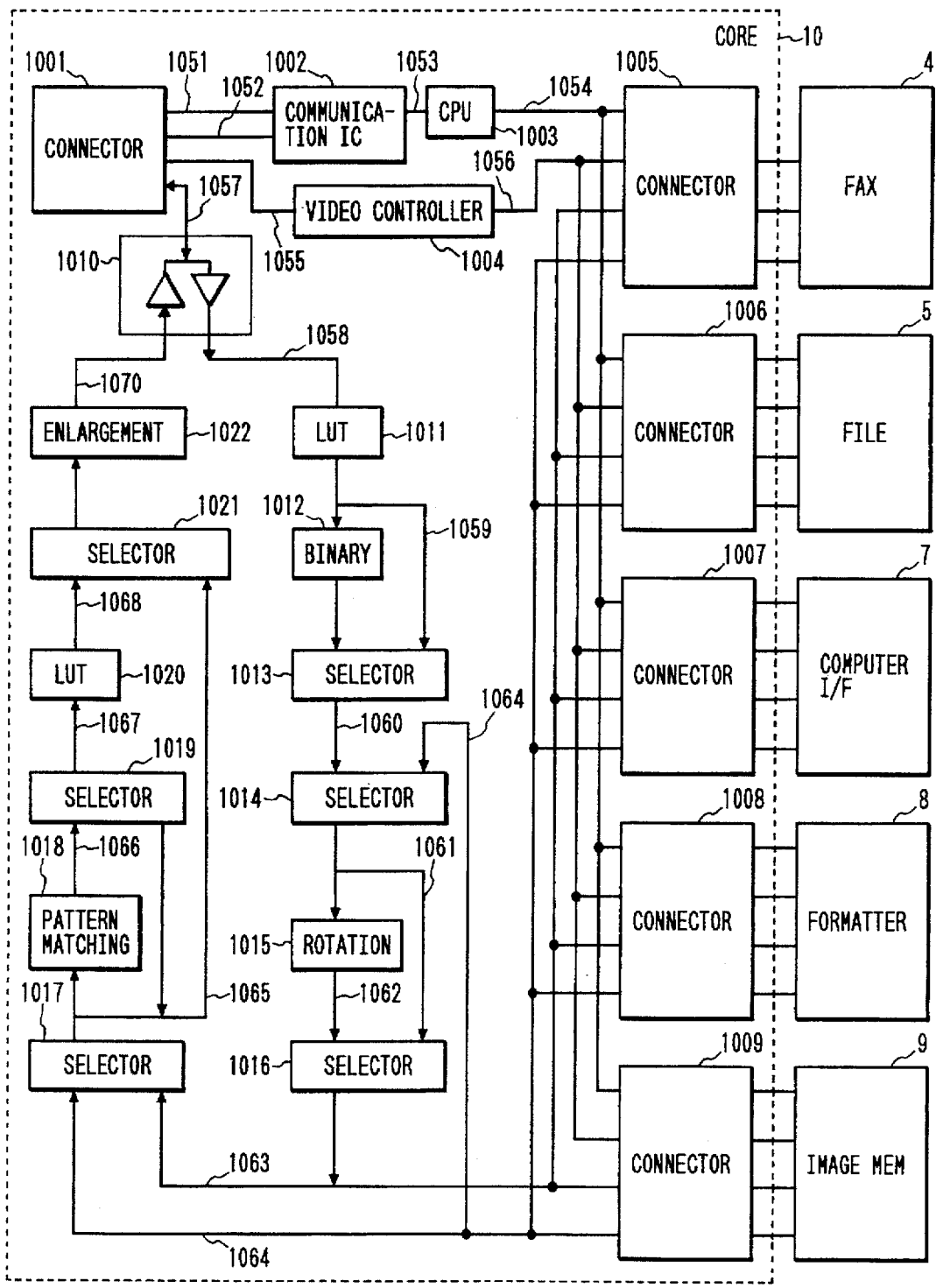
FIG. 4 is a block diagram showing the detail configuration of the core unit shown in FIG. 1.

FIG. 4 is a block diagram showing the detail configuration of the core unit 10 shown in FIG. 4.

The connector 1001 in the core unit 10 is connected to the connector 120 of the reader unit 1 via cables. Four kinds of signals pass through the connector 1001. The signal 1057 is a 8-bit multi-leveled video signal. The signal 1055 is a control signal which controls a video signal. The signal 1051 is used to communicate with the CPU 122 within the reader 1. The signal 1052 is used to communicate with the SUB-.CPU 123 within the reader 1. The communication IC 1002 subjects both the signals 1051 and 1052 to a communication protocol process and transmits the communication information to the CPU 1003 via the CPU bus 1053.

The signal line 1057, or a bi-directional video signal line, allows the core unit 10 to receive information from the reader unit 1 or the core unit 10 to output information to the reader 1. The buffer 1010 connected to the signal line 1057 separates bi-directional signal into the two unidirectional signals 1058 and 1070. The signal 1058, or a 8-bit multi-leveled video signal from the reader 1, input to the next-stage LUT 1011. The LUT 1011 converts the image information from the reader 1 into a desired value, with reference to a look-up table.

The output signal 1059 from the LUT 1011 is input to the binary circuit 1012 or the selector 1013. The binary circuit 1059 has a simple binary function for converting the multi-leveled signal 1059 into a binary signal at a fixed slice level, a binary function of a variable slice level at which a slice level varies from the value of a slice level pixel around a pixel of interest, and a binary function using an error diffusion method. When the binary information is "0", the output signal is converted into a multi-leveled signal of "00H", or when the binary information is "1", the output signal is converted into a multi-leveled signal of "FFH", the result is input to the next-stage selector 1013. The selector 1013 selects the signal from the LUT 1011 or the output signal from the binary circuit 1012. The output signal from the selector 1013 is input to the selector 1014.

The selector 1014 selects the signal 1064, being the output video signals input from the facsimile unit 4, the file unit 5, the computer interface unit 7, the formatter 8, and the image memory unit 9 to the core unit 10 via the connectors 1005, 1006, 1007, 1008, and 1009, respectively, or the output signal 1060 from the selector 1013, in accordance with the command from the CPU 1003. The output signal 1061 from the selector 1013 is input to the rotation circuit 1015 or the selector 1016. The rotation circuit 1015 rotates selectively the input image signal at +90°, −90°, and +180°. After the binary circuit 1012 converts the information output from the reader 1 into a binary signal, the rotation circuit 1015 stores the result as information from the reader 1.

In accordance with the designation from the CPU 1003, the rotation circuit 1015 reads out the stored information by rotation. The selector 1016 selects either the output signal 1062 output from the rotation circuit 1015 or the input signal 1061 input to the rotation circuit 1015 and then outputs the result to the connector 1005 connected to the facsimile unit 4, the connector 1006 connected to the file unit 5, the connector 1007 connected to the computer interface unit, the connector 1008 connected to the formatter 8, the connector 1009 connected to the image memory unit, and the selector 1017, via the signal line 1063.

The signal line 1063 is a synchronous 8-bit unidirectional video bus which transfers image information from the core unit 10 to the facsimile unit 4, the file unit 5, the computer interface unit 7, the formatter 8, and the image memory unit 9. The signal 1064 is a synchronous 8-bit unidirectional video bus which transfers image information from the facsimile unit 4, the file unit 5, the computer interface unit 7, the formatter 8, and image memory unit 9.

The video control circuit 1004 controls the signal lines 1063 and 1064 as the synchronous bus, using its output signal. The signal 1054 is connected to the connectors 1005 to 1009. Numeral 1054 represents a bi-directional 16-bit CPU bus which is used to transmit and receive asynchronously data command. Information can be sent to the facsimile unit 4, the file unit 5, the computer interface unit 7, the formatter 8, the image memory unit 9, and the core unit 10, via two video buses 1063 and 1064 and the CPU bus 1054.

The signal 1064 is input to the selectors 1014 and 1017 from the facsimile unit 4, the file unit 5, the computer interface unit 7, the formatter 8, and the image memory unit 9. The selector 1016 inputs the signal 1064 to the next stage rotation circuit 1015, in accordance with the command from the CPU 1003.

The selector 1017 selects the signals 1063 and 1064 in accordance with the command from the CPU 1003. The selector 1017 inputs its output signal 1065 to the pattern matching 1018 and the selector 1019. The pattern matching 1018 matches the input signal 1065 with a predetermined pattern. When the two patterns match to each other, a predetermined multi-leveled signal is output to the signal line 1066. When the patterns do not match to each other, the input signal is output as the signal 1066.

The selector 1019 selects the signals 1065 and 1066 in accordance with the command from the CPU 1003. The selector 1019 inputs its output signal 1067 to the next stage LUT 1020.

When the image information is output to the printer unit 2, the LUT 1020 converts the input signal 1067 to the characteristic of the printer.

The selector 1021 selects the output signal 1068 from the LUT 1020 or the signal 1065 in accordance with the command from the CPU 1003. The selector 1021 inputs its output signal to the next-stage enlargement circuit 1022.

The enlargement circuit 1022 can set the enlargement power independently in the X-direction and the Y-direction, in accordance with the command from the CPU 1003. The enlarging method is the primary linear interpolating method. The enlargement circuit 1022 inputs its output signal 1070 to the buffer 1010.

The buffer 1010 receives the signal 1070 and outputs the bi-directional signal 1057 in accordance with the command from the CPU 1003. The signal 1070 also is sent to the printer unit 2 via the connector 1001 for a print-out operation.

Next, the signal flows between the core unit 10 and various units will be described below.

[Operation of the core unit 10 based on information from the facsimile unit 4]

The case where information is output to the facsimile unit 4 will be described here. The CPU 1003 communicates with the CPU 122 of the reader 1 via the communication IC 1002 and issues a manuscript scanning command. Since the scanning unit 104 scans the manuscript in response to the command, the reader unit 1 outputs image information to the connector 120. The reader 1, connected to the external device 3 via cables, inputs information to the connector 1001 in the core unit 10.

The image information input to the connector 1001 is input to the buffer 1010 via the multi-leveled 8-bit signal line 1057. The buffer circuit 1010 inputs the bi-directional signal 1057 acting as a unidirectional signal via the signal line 1058, in accordance with the command from the CPU. The LUT circuit 1011 converts the image information from the reader 1 into a desired value using the look-up table. For example, it is possible to skip the groundwork of a manuscript. The LUT 1011 inputs its output signal 1059 to the next-stage binary circuit 1012.

The binary circuit 1012 converts a 8-bit multi-leveled signal 1059 into a binary signal. The binary circuit 1012 converts a binary signal of "0" into a multi-leveled signal "00H" and a binary signal of "1" into a multi-leveled signal "FFH". The binary circuit 1012 inputs its output signal to the rotation circuit 1015 or the selector 1016 via the selectors 1013 and 1014. The rotation circuit 1015 inputs its output signal 1062 to the selector 1016. The selector 1016 selects the signal 1061 or the signal 1062. The signal selection is decided by communicating the CPU 1003 with the facsimile unit 4 via the CPU bus 1054. The selector 1016 sends its output signal 1063 to the facsimile unit 4 via the connector 1005.

Next, explanation will be made below as to how the information from the facsimile unit 4 is received.

The facsimile unit 4 transmits image information to the signal line 1064 via the connector 1005. The signal 1064 is input to the selectors 1014 and 1017. When the printer 2 outputs the image rotated at the facsimile receiving time in accordance with the destination from the CPU 1003, the rotation circuit 1015 rotates the signal 1064 input to the selector 1015. The output signal 1062 from the rotation circuit 1015 is input to the pattern matching 1018 via the selectors 1016 and 1017. When the image at a facsimile receiving time is output to the printer 2 without any change, in accordance with the command from the CPU 1003, the selector 1017 inputs its signal 1064 to the pattern matching 1018.

The pattern matching 1018 has a function of smoothing the image data received at a facsimile receiving time. The pattern matched signal is input to the LUT 1020 via the selector 1019. In order to output a facsimile received image with a desired density to the printer unit 2, the LUT 1020 has a table which can be varied with the CPU 1003. The LUT 1020 inputs the output signal to the enlargement circuit 1022 via the selector 1021.

The enlargement circuit 1022 enlarges a 8-bit multi-leveled signal with two values (00H, FFH) by using the primary linear interpolating method. The enlargement circuit 1022 outputs a 8-bit multi-leveled signal with many values to the connector 1001 via the reader 1.

The reader 1 inputs this signal to the external I/F switching circuit 119 via the connector 120. The external I/F switching circuit 119 receives a signal from the facsimile unit 4 to the Y-signal generation and color detection circuit 113. After the above-mentioned procedure, the signal from the Y-signal generation and color detection circuit 113 is output to the printer 2 to draw an image on an output paper.

[Operation of the core unit 10 based on information from the formatter 8]

The case where the file unit 5 receives information will be described below.

The CPU 1003 communicates with the CPU 122 of the reader 1 via the communication IC 1002 to issue a manuscript scanning command. Since the scanning unit 104 scans the manuscript according to the command, the reader 1 outputs image information to the connector 120. The reader 1 is connected to the external device 3 via cables. The information input to the connector 1001 is input to the connector 1001 in the core unit 10. The buffer 1010 outputs the image information input as the unidirectional signal 1058.

The LUT 1011 converts the multi-leveled 8-bit signal 1058 into a desired signal. The LUT 1011 inputs the output signal 1059 to the connector 1006 via the selectors 1013, 1014, and 1016.

That is, the 8-bit multi-leveled signal is transferred to the file circuit 5 as it is, without using the functions of the binary circuit 1012 and the rotation circuit 1015. In order to communicate the CPU 1003 with the file unit 5 via the CPU bus 1054, the functions of the binary circuit 1012 and the rotation circuit 1015 are used. Since the binary processing and the rotation processing are similar to those in the facsimile, the explanation of these function will be omitted here.

Next, how the file unit 5 receives information will be described below.

The image information from the file unit 5, or the signal 1064, is input to the selectors 1014 or 1017 via the connector 1006. In the case of the 8-bit multi-level filing, the image information can be input to the selector 1017. In the case of the binary filing, the image information can be input to the selector 1014 or 1017. In the binary filing, the process is similar to that in the facsimile. Hence the explanation of this process will be omitted here.

In the multi-level filing, the selector 1017 inputs its output signal 1065 to the LUT 1020 via the selector 1019. In the LUT 1020, a look-up table is formed to a desired print density, in accordance with the instruction from the CPU 1003. The LUT 1020 inputs its output signal 1068 to the enlargement circuit 1022 via the selector 1021. The 8-bit multi-level signal 1070 enlarged to a desired enlargement ratio with the enlargement circuit 1022 is transferred to the reader 1 via the buffer 1010 and the connector 1001. Like the facsimile described above, the information of the file unit sent to the reader 1 is output to the printer 2 to draw an image on the output paper.

[Operation of the core unit 10 based on information from the computer interface unit 7]

The computer interface unit 7 interfaces with the computer connected to the external device 3. The computer interface unit 7 includes plural interfaces each which communicates with SCSI, RS232C, and Centronics system. The computer interface unit 7 has three kinds of interfaces each which sends information to the CPU 1003 via the connector 1007 and the data bus 1054. The CPU 1003 performs various controls, based on the content received.

[Operation of the core unit 10 based on information from the formatter 8]

The formatter 8 expands command data such as document file sent from the computer interface unit 7 to image data. If it is decided that data sent from the computer interface unit 7 via the data bus 1054 is one regarding the formatter 8, the CPU 1003 transfers data to the formatter 8 via the connector 1008. The formatter 8 expands meaningful images such as characters and figures from the data transferred form memory.

Next, the procedure in which an image is drawn on an output paper based on information sent from the formatter 8 will be described below.

The image information from the formatter 8 is transferred as a multi-level signal with two values (00H, FFH) to the signal line 1064 via the connector 1008. The signal 1064 is input to the selectors 1014 and 1017. The selectors 1014 and 1017 are controlled under the instruction from the CPU 1003. The following process is similar to that of the facsimile. Hence the explanation of this process will be omitted here.

[Operation of the core unit 10 based on information from the image memory unit 9]

The case where information is sent to the image memory unit 9 will be described below.

The CPU 1003 communicates with the CPU 122 in the reader 1 via the communication IC 1002 to issue a manuscript scanning command. When the scanning unit 104 scans the manuscript in response to the command, the reader 1 outputs image information to the connector 120. The reader 1 is connected to the external device 3 via the cables. Information is input to the connector 1001 in the core unit 10. The image information sent to the connector 1001 is sent to the LUT unit 1011 via the multi-level 8-bit signal line 1057 and the buffer 1010. The LUT 1011 transfers its output signal 1059 as multi-level image information to the image memory unit 9 via the selectors 1013, 1014, and 1016 and the connector 1009. The image information stored in the image memory unit 9 is sent to the CPU 1003 via the connector 1003 and the CPU bus 1054. The CPU 1003 transfers data sent from the image memory unit 9 to the computer interface unit 7. In the computer interface unit 7, a desired interface among three interfaces (SCSI, RS232C, and Centronics) transfers information to the computer.

Next, the case where information will be received from the image memory unit 9 will be described below.

Image information is sent from the computer to the core unit 10 via the computer interface unit 7. If it is decided that data sent from the computer interface unit 7 via the CPU bus 1054 regards the image memory unit 9, the CPU 1003 in the core unit 10 transfers to the image memory unit 9 via the connector 1009. Next, the image memory unit 9 transfers 8-bit multi-level signal 1064 to the selectors 1014 and 1017 via the connector 1009.

Like the operation of the facsimile, the output signals from the selectors 1014 and 1017 are output to the printer 2 under the command from the CPU 1003 to draw an image on an output paper.

[Explanation of the facsimile unit 4]

Figure 5:
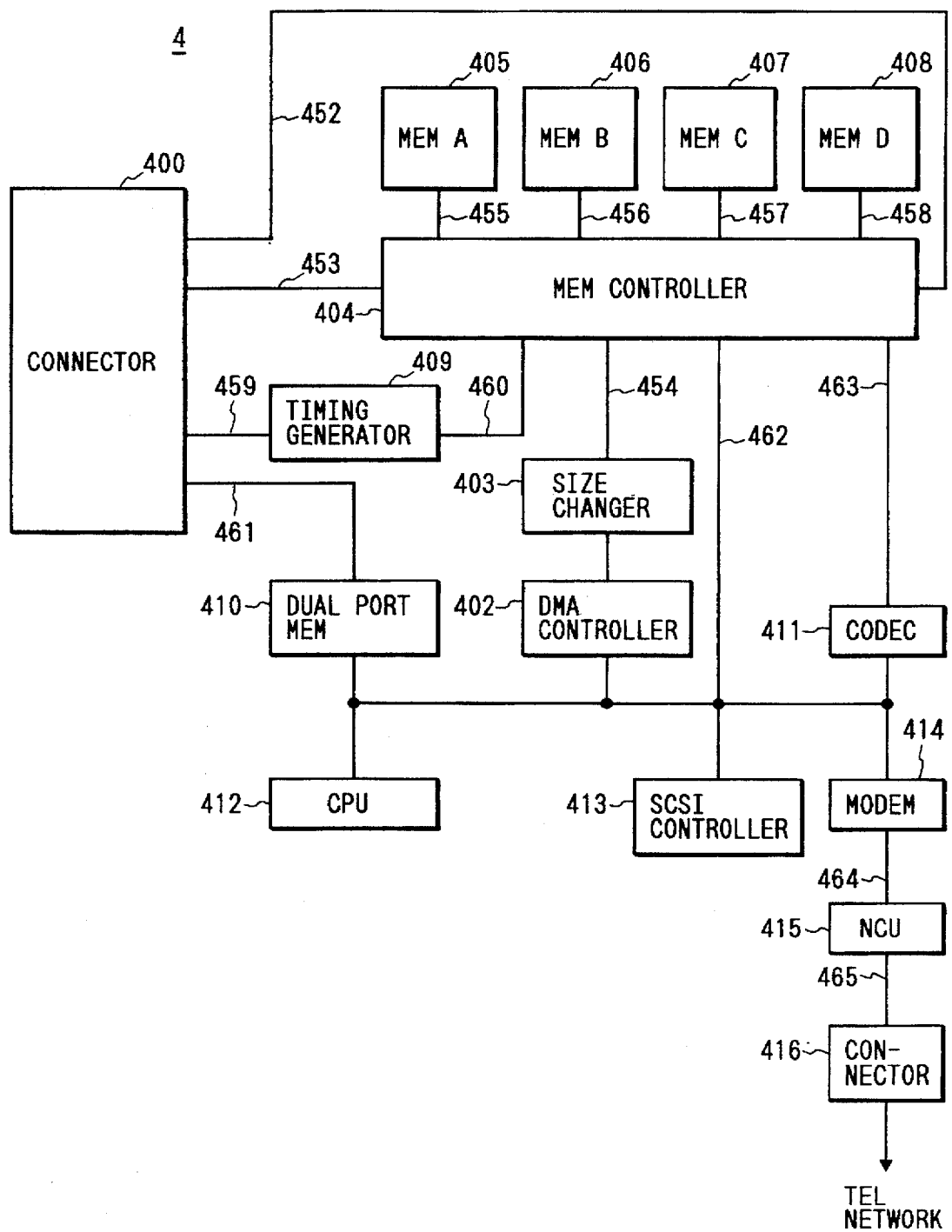
FIG. 5 is a block diagram showing the detail configuration of the facsimile unit shown in FIG. 1.

FIG. 5 is a block diagram showing the detail configuration of the facsimile unit 4 shown in FIG. 1.

The facsimile unit 4 is connected to the core unit 10 via the connector 400 to exchange various signals. When binary information from the core unit 10 stores in any one of the memories A405 to D408, the memory controller 404 receives the signal 453 from the connector 400. Under control of the memory controller, the information is stored in either any one of the memories A405, B406, C407, and D408, or a cascade connection of two sets of memories.

In accordance with the command from the CPU 412, the memory controller 404 has five functions: a mode where data are exchanged between the memories A405, B406, C407, and D408, and the CPU bus 462; a mode where data are exchanged with the CODEC bus 463 connected to the CODEC 411 with modulation/demodulation function; a mode where the content in the memory A405, B406, C407, or D408 is exchanged with the data bus 454 from the size change circuit 403 under the command from the DMA controller 402; a mode where binary video input data 454 is stored into any one of the memories A405 to D408 under the control of the timing generating circuit 409; and a mode where a memory content is output from any one of memories A405 to D408 to the reading signal line 452.

The memories A405, B406, C407, and D408, each of which has a memory capacity of 2M-bytes, store an image corresponding to A4-size with a resolution of 400 dpi. The timing generating circuit 409, which is connected to the connector 400 via the signal line 459, is activated by the control signal (HSYNC, HEN, VSYNC, VEN) from the core unit 10 to produce the signal which achieves the following two functions.

The first function is to store image information from the core unit 10 into any one or two of the memories A405 to D408. The second function is to transfer an image signal from any one of the memories A405 to D408 to the reading signal line 452. The dual port memory 410 is connected to the CPU 1003 in the core unit 10 via the signal line 461 and the CPU 412 in the facsimile unit 4 via the signal line 462. Each CPU exchanges command via the dual port memory 410.

The SCSI controller 413 interfaces with a hard disk connected to the facsimile unit 4 shown in FIG. 1. Data is stored at a facsimile transmitting or receiving time. After the CODEC 411 reads image information stored in one of the memories A405 to D408 and encodes it with a desired one of the MH, MR, and MMR methods, it stores the result as encoded information into any one of the memories A405 to D408. After the encoded information stored in the memories A405 to D408 is read to encode it with a desired one among the MH, MR, and MMR methods, the result is stored as decoded information or image information into any one of the memories A405 to D408. The MODEM 414 has the function which modulates encoded information from the hard desk connected to the CODEC 411 or SCSI controller 413 to transmit on a telephone line, demodulates information sent from the NCU 415, converts the result into encoded information, and transfers the encoded information to the hard disk connected to the CODEC 411 or SCSI controller 413. The NCU 415 exchanges information with an exchange installed in a telephone office connected directly to telephone lines, in accordance with a predetermined procedure.

An embodiment of the facsimile transmission will be described below. The binary image signal from the reader 1 is input to the memory controller 404 via the connector 400 and the signal line 453. The signal 453 is stored into the memory A405 by means of the memory controller 404. The timing generating circuit 409 produces the timing stored in the memory A405 in response with the timing signal A405 from the reader 1. The CPU 412 connects the memories A405 and B406 of the memory controller 404 to the CODEC 411 via the bus line 463.

The CODEC 411 reads image information out of the memory A405, encodes it by means of the reading MR method, and writes the encoded information into the memory B406. When the CODEC 411 encodes image information corresponding to the A4-size, the CPU 412 connects the memory B406 in the memory controller 404 to the CPU bus 462. The CPU 406 is connected to the CPU bus 462.

The CPU 412 reads sequentially encoded information out of the memory B406 to transfer it to the MODEM 414. The MODEM 414 modulates the encoded information and then transmits the facsimile information to the telephone line via the NCU.

Next, an embodiment of the facsimile receiving operation will be described below. The NCU 415 receives information sent via the telephone line and then connects to the facsimile unit 4 through a predetermined procedure. The MODEM 414 demodulates the information from the NCU 415. The CPU 412 stores information from the MODEM 414 via the CPU bus 462.

When the memory C407 stores information corresponding to an image frame, the CPU 412 controls the memory controller 404 to connect the data line 457 for the memory C407 to the line 463 for the CODEC 411. The CODEC 411 reads sequentially the encoded information from the memory C407 and then decodes or stores the result as image information into the memory D408. The CPU 412 communicates with the CPU 1003 in the core unit 10 via the dual port memory 410, and sets to output on the printer unit 2 an image from the memory D408 via the core unit. At the end of the setting, the CPU 412 activates the timing generating circuit 409 to output a predetermined timing signal from the signal line 460 to the memory controller.

The memory controller 404 reads image information out of the memory D408, in synchronism with the signal from the timing generating circuit 409, to output it to the connector 400 via the signal line 452. The operation in which information is output from the connector 400 to the printer unit 2 is similar to that of the core unit. Hence the detailed explanation of this operation will be omitted here.

[Explanation of the file unit 5]

Figure 6:
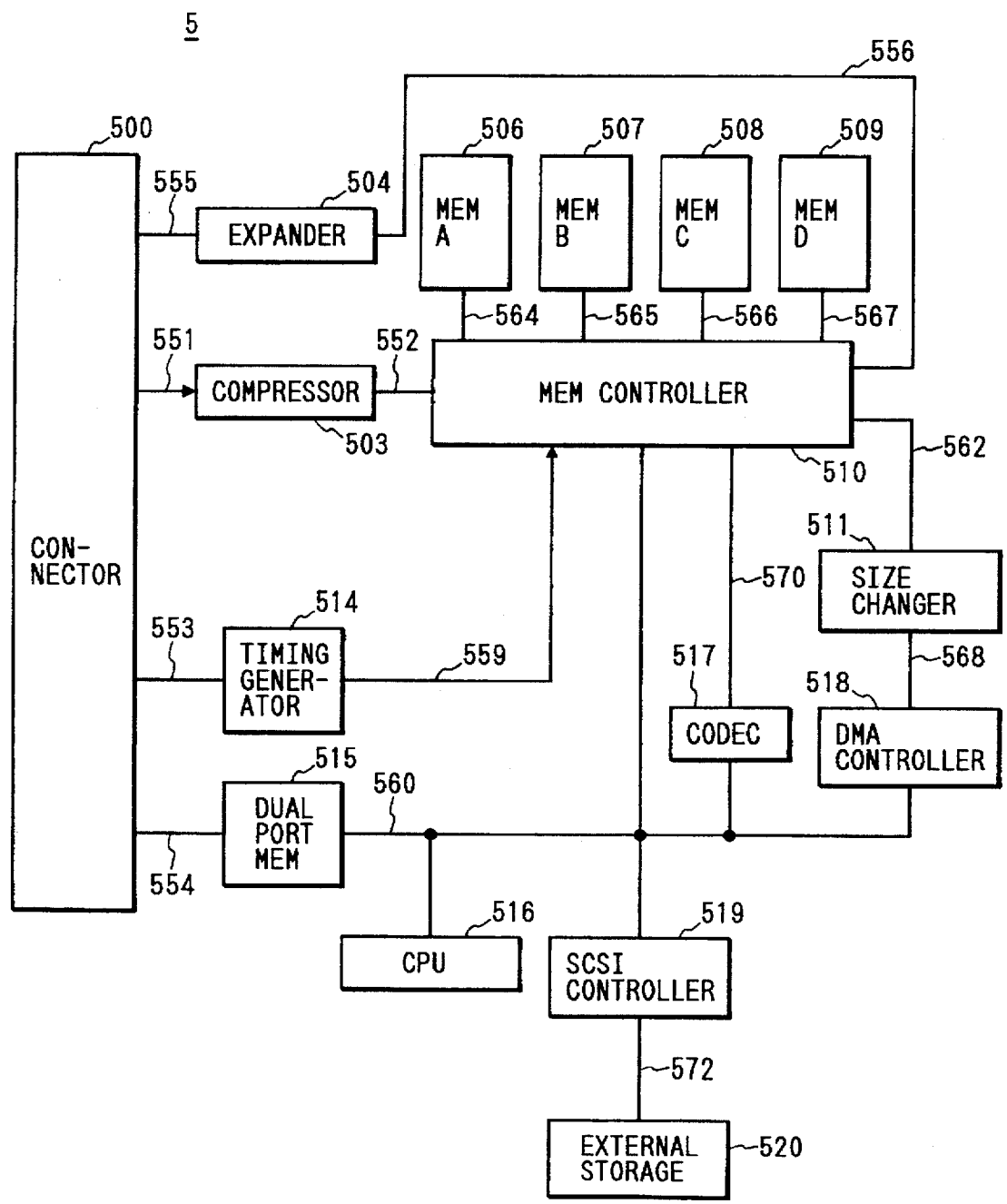
FIG. 6 is a block diagram showing the detail configuration of the file unit shown in FIG. 1.

FIG. 6 is a block diagram showing the detail configuration of the file unit 5 shown in FIG. 1. The configuration and operation will be described below.

The file unit 5, which is connected to the core unit 10 via the connector 500, exchanges various signals. The compressing circuit 503 inputs the multi-level input signal 551 and converts multi-level image information into compressed information to output the result to the memory controller 510. Under the control of the memory controller 510, the output signal 552 from the compressing circuit 503 is stored into either any one of the memories A506, B507, C508, and D509, or two sets of the memories in a cascade connection.

The memory controller 510 has five functions: a mode where data is exchanged between one among the memories A506, B507, C508, and D509, and the CPU bus 560, under the command from the CPU 516; a mode where data is exchanged with the CODEC bus 570 associated with the CODEC 517 which performs coding and decoding; a mode where data, or the content stored in the memories A506, B507, C508, and D509, is exchanged with the size change circuit 511 via the bus 562, under the control of the DMA controller 518; a mode where the signal 563 is stored into any one of the memories A506 to D509 under the control of the timing generating circuit 514; and a mode where the memory content is read out of the any one of the memories A506 to D509 to output it to the signal line 558.

The memories A506, B507, C508, and D509 have a memory capacity of 2M-bytes, respectively, and store images corresponding to A4-size frame with a resolution of 400 dpi. The timing generating circuit 514, connected to the connector 500 via the signal line 553, is activated by the control signal (HSYNC, HEN, VSYNC, and VEN) from the core unit 10, thus producing a signal which achieves the following two functions.

The first function is to store the information from the core unit 10 into one or two of the memories A506 to D509. The second function is to transmits image information read out of one of the memories A506 to D509. The dual port memory 515 is connected to the CPU 1003 in the core unit 10 via the signal line 554 and to the CPU 516 in the file unit 5 via the signal line 560.

Each CPU exchanges commands via the dual port memory 515. The SUSI controller 519 interfaces with the external storage device 6 connected to the file unit 5 shown in FIG. 1.

The external storage device 6 is formed, in concrete, of a magnetic-optical disk which stores data such as image information. The CODEC 517 reads image information stored any one of the memories A506 to D509 and encodes it by means of one desired among the MH, MR, and MMR methods. Then the result is stored as encoded information into one of memories A506 to D509. The CODEC 517 also reads out the encoded information stored in the memories A506 to D509, and then decodes it by means of a desired one of the MH, MR, and MMR methods, and finally stores the result as decoded information or image information into any one of the memories A506 to D509.

Next, an embodiment in which how the file information is stored in the external storage device 6 will be described below.

The compressing circuit 503 receives an 8-bit multi-level image signal from the reader 1 via the connector 500 and the signal line 551. The compressing circuit 503 converts the signal 551 into compressed information 552. The memory controller 510 receives the compressed information 552. The memory controller 510 stores the compressed signal 552 into the memory A506, in accordance with the timing signal 559 that the timing generating circuit 559 produces in response to the signal 553 from the core unit 10. The CPU 516 connects the memories A506 and B507 associated with the memory controller 510 to the CODEC 517 via the bus line 570.

The CODEC 517 reads the compressed information out of the memory A506, and encodes it by means of MR method, and then writes the encoded information into the memory B507. After the CODEC 517 finishes the encoding, the CPU 516 connects the memory B507 associated with the memory controller 510 to the CPU bus 560. The CPU 516 is connected to the CPU bus 560. The CPU 560 reads sequentially the encoded information out of the memory B507 to transfer it to the SCSI controller 519. The SCSI controller 519 stores the encoded information 572 in the external storage device 6.

Next, explanation will be made below as to an embodiment in which information read out of the external storage device 6 is output to the printer 2. In response to an information retrieving and printing command, the CPU 516 receives encoded information from the external storage device 6 via the SCSI controller 519 and then transfers the encoded information to the memory C508. At this time, the memory controller 510 connects the CPU bus 560 to the bus 566 of the memory C508 in accordance with the instruction from the CPU 516. When the encoded information has been completely transferred to the memory C508, the CPU 516 controls the memory controller 510, thus connecting the memories C508 and D509 to the bus 570 of the CODEC 517. The CODEC 517 reads encoded information out of the memory C508, and then decodes sequentially it, and finally transfers the result to the memory D509. Where a size change such as enlargement and reduction is needed at the outputting operation to the printer unit 2, the memory D509 is connected to the size change circuit 511 via the bus 562, whereby the content of the memory D509 is varied in size under the control of the DMA controller 518. The CPU 516 communicates with the CPU 1003 in the core unit 10 via the dual port memory 515 to set to print out an image from the memory D509 to the printer 2 via the core unit 10. At the setting completion, the CPU 516 activates the timing generating circuit 514 to output a predetermined timing signal to the memory controller 150 via the signal line 559. The memory controller 510 reads decoded information out of the memory D509 in synchronism with the signal from the timing generating circuit 514 to transmit it to the signal line 514. Information is output to the core unit 10 via the signal line 556 and the connector 500. The operation in which information is output from the connector 500 to the printer unit 2 is similar to that in the core unit 10. Hence, the duplicate explanation will be omitted here.

[Explanation of the computer interface unit 7]

Explanation will be made below as to the computer interface unit 7 with reference to FIG. 7.

Figure 7:
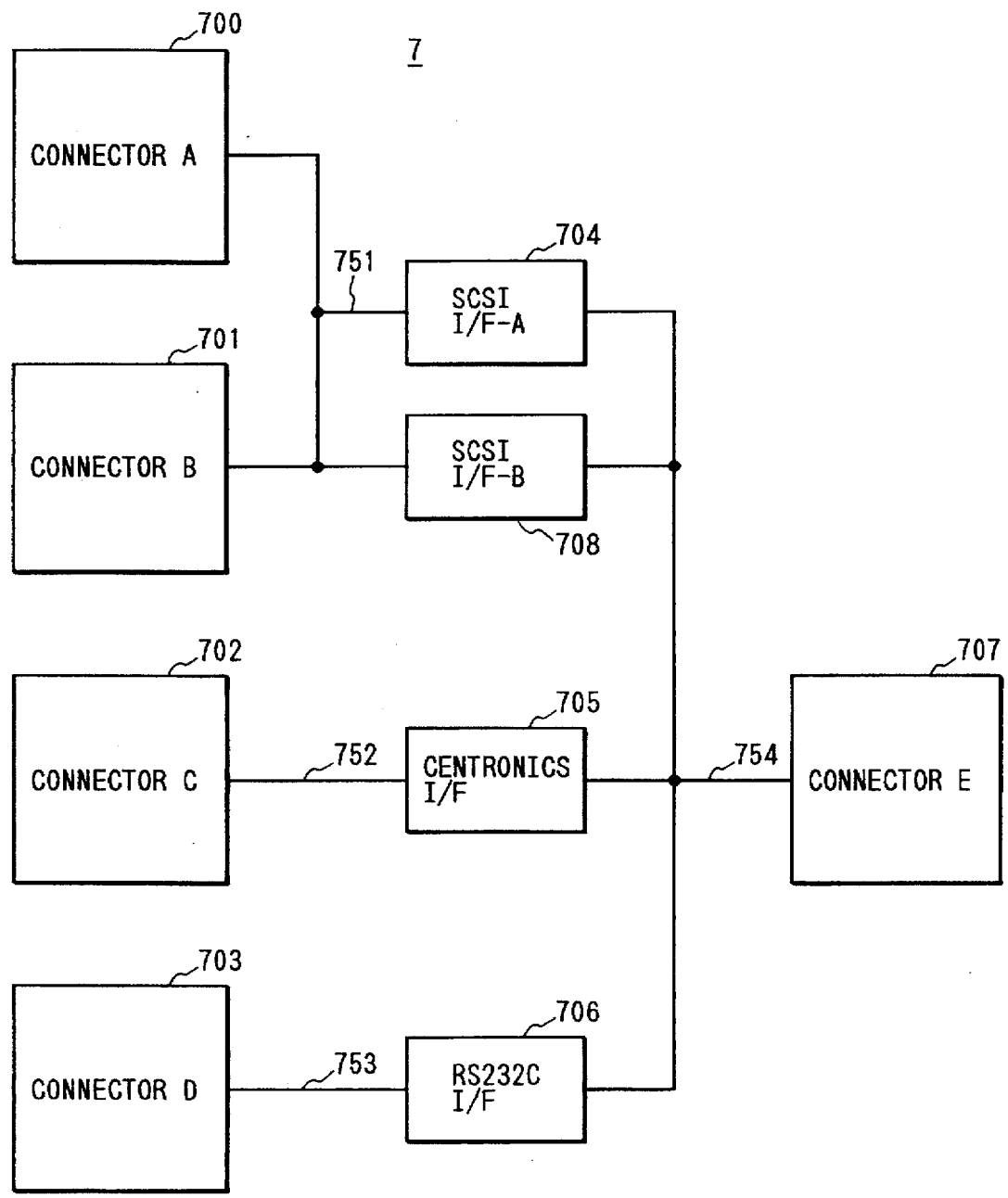
FIG. 7 is a block diagram used for explaining the detail configuration of the computer interface unit shown in FIG. 1.

FIG. 7 is a block diagram used for explaining the detail configuration of the computer interface unit 7 shown in FIG. 1.

The connectors A700 and B701 are a SCSI interface connector. The connector C702 is a Centronics interface connector. The connector D703 is a RS232C interface connector. The connector E707 is a connector for connecting the core unit 10.

The SCSI interface includes two connectors (connector A700 and connector B701). Where devices with plural SCSI interfaces are cascade-connected to each other using the connectors A700 and B701. Where the external device 3 is connected face to face to the computer, either the connector A700 is connected to the computer via a cable while the connector B701 is connected to the terminator, or the connector B701 is connected to the computer while the connector A700 is connected to a terminator. The information input via the connector A700 or B701 is input to the SCSI.I/F-A704 or SCSI.I/F-B708 via the signal line 751.

The SCSI.I/F-A704 or SCSI.I/F-B708 takes proceedings in accordance with the SCSI protocol and then data is output to the connector E707 via the signal line 54. The connector E707 is connected to the CPU bus 1054 of the core unit 10. The CPU 1003 in the core unit 10 receives information input from the CPU 1054 to the SCSI.I/F connector (connector A700 and connector B701). When data is output from the CPU 1003 in the core unit 10 to the SCSI connector (connector A700 and connector B701), the process goes in the opposite flow to the above-described procedure.

The Centronics interface I/F705 is connected to the connector C702 via the signal line 752. The Centronics I/F754 receives data in accordance with a predetermined protocol to output it to the connector E707 via the signal line 754. The connector E707 is connected to the CPU bus 1054 in the core unit 10. The CPU 1003 in the core unit 10 receives information input from the CPU bus 1054 to the Centronics I/F connector (connector C702).

The RS232C interface connected to the connector 703 is input to the RS232C.I/F706 via the signal line 753. The RS232C.I/F706 receives data in accordance with a predetermined protocol procedure and outputs the connector E707 via the signal line 754. The connector E707 is connected to the CPU bus 1054 in the core unit 10. The CPU 1003 in the core unit 10 receives information input from the CPU bus 1054 to the RS232C.I/F connector (connector D703). When data from the CPU 1003 in the core unit 10 is output to the RS232C.I/F connector (connector D703), the process goes in the opposite flow to the above-mentioned process.

[Explanation of the formatter 8]

Figure 8:
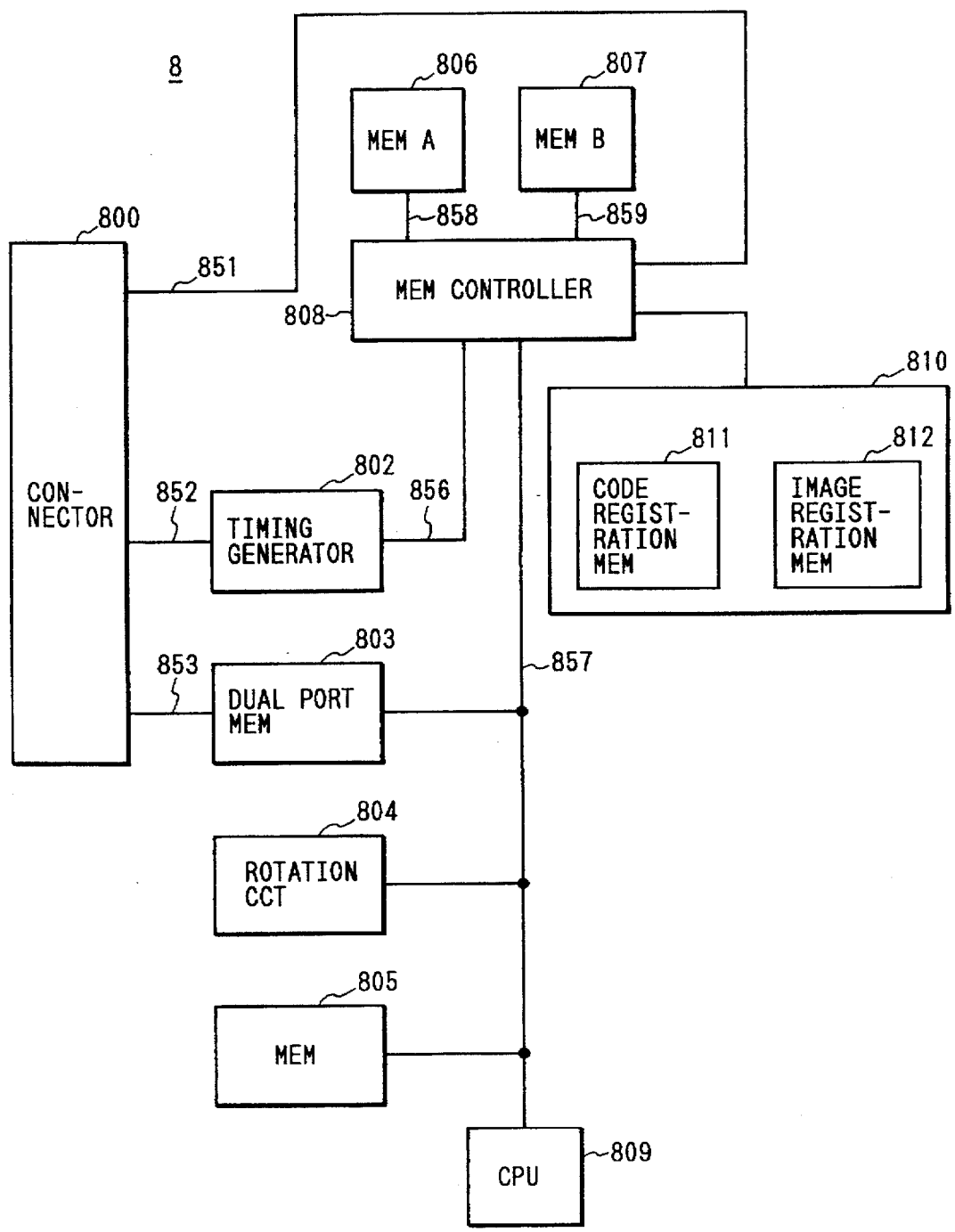
FIG. 8 is a block diagram showing the detail configuration of the formatter shown in FIG. 1.

FIG. 8 is a block diagram showing the detail configuration of the formatter 8 shown in FIG. 1. The configuration and operation of the formatter 8 will be described below.

The core unit 10 processes the input data (formed of character codes and control codes) from the computer interface unit 7 (already described) as follows. If the input data relates to the formatter 8, the CPU 1003 in the core unit 10 transfers input data from the computer to the dual port memory (receiving buffer) 803 via the connectors 1008 of the core unit 10 and the connector 800 of the formatter 9. The CPU 809 in the formatter 8 receives data which is sent from the computer via the dual port memory 803.

The CPU 809 expands sequentially code data in the input data into image data and then transfers the image data to the memory (bit-map memory) A806 or B807 via the memory controller 808. The memories A806 and B807 have a memory capacity of 1M-bytes, respectively. Each memory (A806 or B807) can deal with the A4-size frame with a resolution of 400 dpi. In order to deal with up to the A3-size frame with a resolution of 300 dpi, the image data is expanded by cascading the memories A806 and B807. The memory control is done by means of the memory controller 808, under the command from the CPU 809.

When a character or figure is rotated to expand image data, the rotation circuit 804 rotates it, thus transferring the result to the memory B807. When the memory A806 or B807 has completed the image data expansion, the CPU 809 controls the memory controller 808, thus connecting the data bus line 858 associated with the memory A806 or the data bus line 859 associated with the memory B807 to the output line 855 associated with the memory controller 808.

Next, the CPU 809 communicates with the CPU 1003 in the core unit 10 via the dual port memory 803 and sets the situation to a mode in which the image data from the memory A806 or B807 is externally output via the connector 800. A print output mode, for example, is set to the CPU 122, using the communication function which is built in the CPU 122 in the reader 1 via the communication circuit 1002 within the core unit 10.

When the print-output mode is set, the CPU 1003 in the core unit 10 activates the timing generating circuit 802 via the connector 1008 and the connector 800 of the formatter 8. The timing generating circuit 802 produces a timing signal which reads image data out of the memory A806 or B807 to the memory controller 808, in accordance with the signal from the core unit 10. Image data from the memory A806 or B807 is input to the memory controller 808 via the signal line 858. The memory controller 808 transfers image data to the core unit 10 via the signal line 851 and the connector 800. The operation in which information is output from the core unit 10 to the printer unit is similar to that of the core unit 10. Hence the explanation of this operation will be omitted here.

Numeral 805 represents a memory (e.g. ROM) which stores a control program corresponding to the flow charts shown in FIGS. 10A to 12B (to be described later), and 810 represents a registration memory which registers form information (to be described later). The registration memory 810 consists of a code registration memory 811 which stores and registers form information as code data, and an image registration memory 812 which stores and registers form information as image data that is, as a form pattern.

In the general operation of the formatter 8, with the control program stored in the memory 805, shown with the flow charts in FIGS. 10A to 12B, the CPU 809 stores form information as code data transferred from the computer PC to the code registration memory 811 or stores form data as image data (form pattern) to the image registration memory 812, in response to the registration designation information.

The CPU 809 superimposes or overlays a second pattern output data (bit-map data) created from input data transferred from the computer PC with either a form pattern (bit-map data) created from code data stored in the code registration memory 811 or the form pattern (bit-map data) stored in the image registration memory 812; produces and stores the resultant composite image or form overlay pattern to the memory A806 or B807; and outputs the form overlay pattern to, for example, at least one of the file unit 5, the facsimile unit 4, and the printer 2, in accordance with the pattern output command.

The overlay pattern output to the facsimile unit 4 may be transferred to a facsimile connected to a network. Also, the form overlay pattern to be output to the printer unit 2 may be transferred to the printer connected to a network.

[Explanation of the image memory unit 9]

Figure 9:
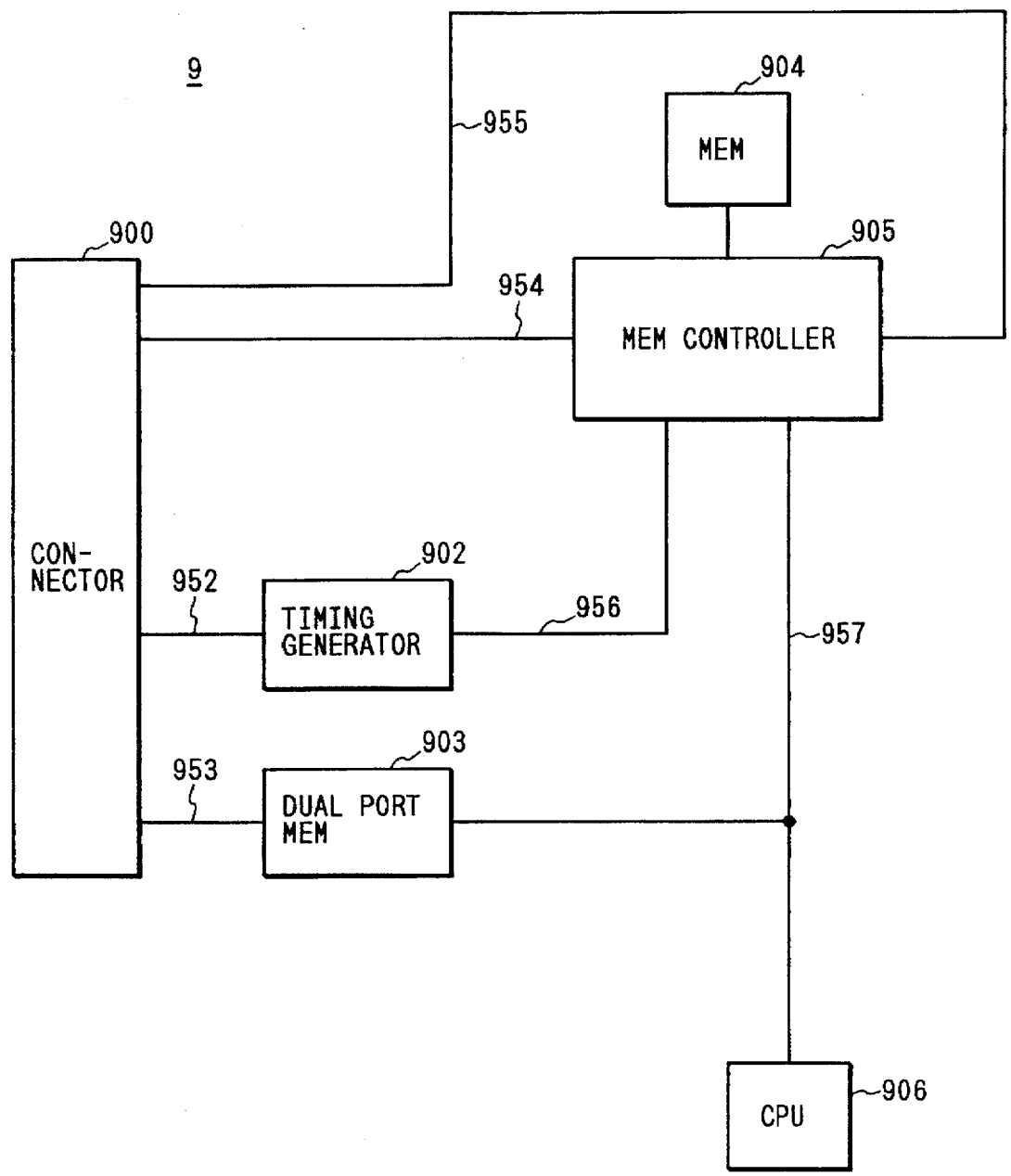
FIG. 9 is a block diagram showing the detail configuration of the image memory unit shown in FIG. 1.

FIG. 9 is a block diagram showing the detail configuration of the image memory unit 9 shown in FIG. 1. The configuration and operation will be described below.

The image memory unit 9, connected to the core unit 10 with the connector 900, exchanges various signals. The multi-level signal 954 is stored in the memory 904 under the control of the memory controller 905. The memory controller 905 has three functions: a mode where data is exchanged between the memory 904 and the CPU bus 957 in accordance with the instruction from the CPU; a mode where the signal 954 is stored in the memory 904 under the control of the timing generating circuit 902; and a mode where a memory content is read out of the memory 904 to output it to the signal line 955. The memory 904 has a memory capacity of 32M-bytes and stores substantially the A3-size image with a resolution of 400 dpi and 256 levels of gray. The timing generating circuit 902, connected to the connector 900 and the signal line 952, is activated in response to the control signal (HSYNC, HEN, VSYNC, and VEN) from the core unit 10, producing a signal which achieves the following two functions.

The first function stores information from the core unit 10 into the memory 904. The second function transmits image data to the reading signal line 955.

The dual port memory 903 is connected to the CPU 1003 in the core unit 10 via the signal line 953 and to the CPU 906 in the image memory unit 9 via the signal line 957. Each CPU exchanges commands via the dual port memory 903.

An embodiment in which the image memory unit 9 stores image data and then transfers it to the computer will be described below.

The 8-bit multi-level image signal from the reader 1 is input to the memory controller 905 via the connector 900 and the signal line 954. The timing generating circuit 902 produces the timing signal 956 in response to the signal 952 from the core unit 10. The memory controller 905 stores the signal 954 into the memory 904 in accordance with the timing signal 956. The CPU 906 connects the memory 904 associated with the memory controller 905 to the CPU bus 957. The CPU 906 also reads sequentially data out of the memory 904 to the dual port memory 903. The CPU 1003 in the core unit 10 reads image data stored in the dual port memory 903 in the image memory unit 9 via the signal line 953 and the connector 900 and then transfers it to the computer interface unit 7. Transferring image data from the computer interface unit 7 to the computer has been already described. Hence the explanation of this transfer operation will be omitted here.

Next, an embodiment in which image data from the computer is output to the printer 2 will be described below. Image data sent from the computer is sent to the core unit 10 via the computer interface unit 7. The CPU 1003 in the core unit 10 transfers image data to the dual port memory 903 in the image memory unit 9 via the CPU bus 1054 and the connector 1009.

The CPU 906 controls the memory controller 905 and connects the CPU bus 957 to the bus associated with the memory 904. The CPU 906 also transfers image data from the dual port memory 903 to the memory 904 via the memory controller 905. When the image data has been completely transferred to the memory 904, the CPU 906 controls the memory controller 905 to connect the data line to the signal 955.

The CPU 906 communicates with the CPU 1003 in the core unit 10 via the dual port memory 903 and sets to print out image data from the memory 904 to the printer unit 2 via the core unit 10. At the end of the setting, the CPU 906 activates the timing generating circuit 902 and outputs a predetermined signal from the signal line 956 to the memory controller 905.

The memory controller 905 reads image data out of the memory 904, in synchronism with the signal from the timing generating circuit 902, and then outputs it to the connector 900 via the signal line 955. The operation in which information is output from the connector 900 to the printer unit has been already described with that of the core unit 10. Hence the duplicate explanation will be omitted here.

[First overlay registration/output process]

Next, with reference to the flow charts shown in FIGS. 10A to 12B, the data processing operation in the image forming system according to the present invention will be described, using the basic information flow and the operational method (described above).

Figure 10B:
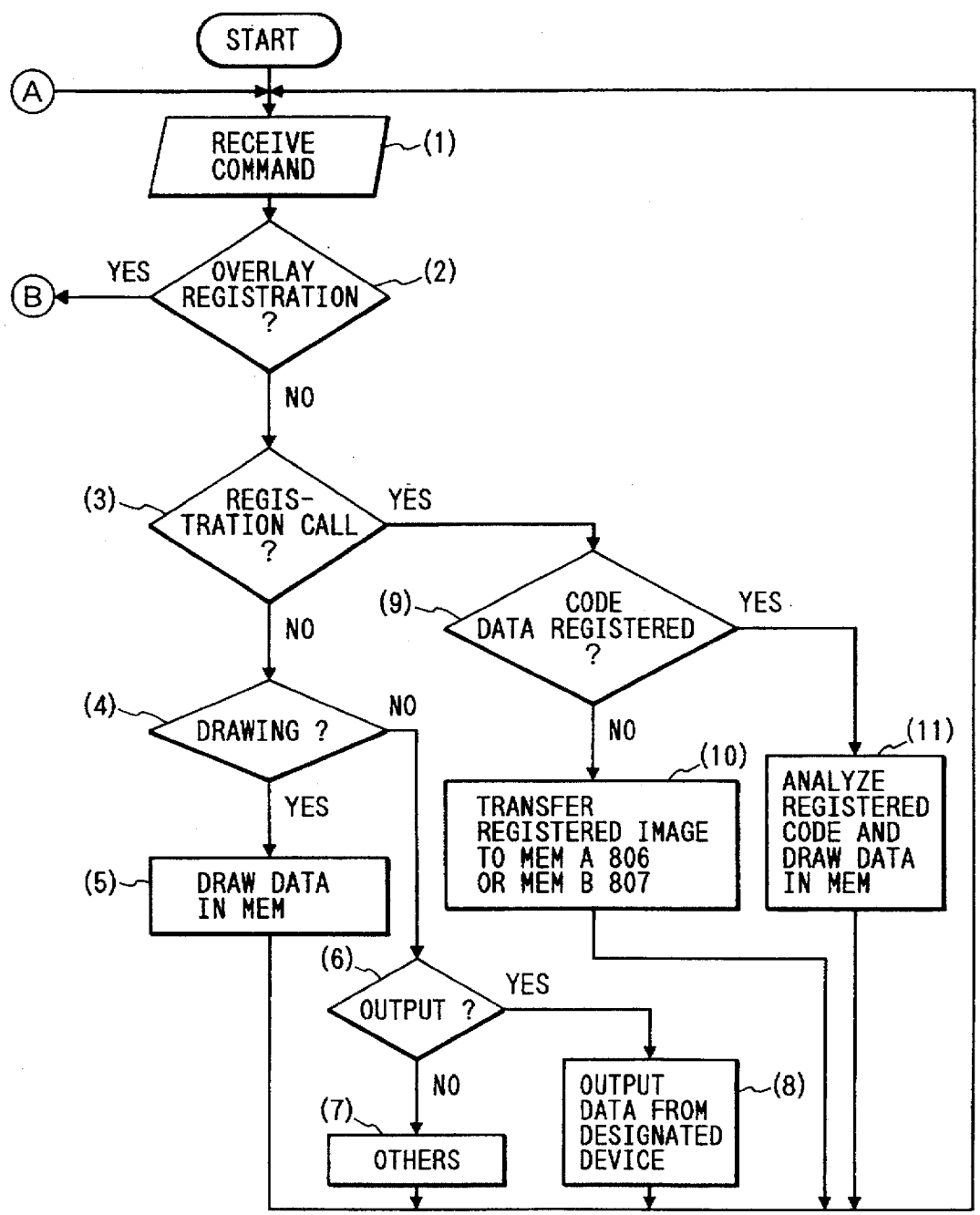
FIG. 10 is comprised of FIGS. 10A and 10B showing flow charts of an example of the first overlay registration/output processing procedure in the image forming system according to the present invention.

FIGS. 10A and 10B show the flow charts showing an example of the first overlay registration/output processing steps in the image forming system according to the present invention. Numerals (1) to (22) represent steps. The way in which various units of the image forming system shown in FIG. 1 execute the overlay (form information) registration according to external commands corresponds to the control procedure in which form information is selectively stored in code format or as an image (form pattern). The procedure will be described below in order.

The formatter 8 expands input data such a document file sent from the computer interface unit 7 via the computer PC into image data. When it is decided that data sent from the computer interface unit 7 via the data bus 1054 relates to formatter 8, the CPU 1003 in the core unit 10 transfers data to the formatter 8 via the connector 1008. The CPU 809 in the formatter 8 translates the transferred data, and executes it in accordance with the flow chart shown in FIGS. 10A and 10B.

After the power source is switched on, the CPU 809 receives externally a command in the step (1), and then decides if the received command is an overlay registration command in the step (2). If the received command is a registration command, it is decided that the registration method in the step (12) relates to information for registering in a code data format or in an image data format. In the case of a drawing data registration command which instructs the formatter 8 to register image data, the image registration memory 812 is cleared in the step (18), and then the external data is received in the step (19). Until it is judged that the external data is a registration end command in the step (20), code data (form information) sent from the CPU 1003 in the core unit 10 to the formatter 8 is received. In the step (21), the formatter 8 continues to translate the received code data into image data and store the "drawn" image data in the image registration memory 812. In the step (20), when it is determined that the received data is a registration end command in the step (20), the image data (form pattern) drawn in the image registration memory is preserved in the image registration memory in the step (22). Then the flow goes back to step (1).

On the other hand, when it is decided that the registration command is a code registration command in the step (12), the code previously registered in the code registration memory 811 in the step (13) is cleared and then external data is received in the step (14). Then, until the step (15) determined it is the end of registration the code data (form information) which is transferred from the CPU 1003 in the core unit 10 to the formatter 8 is received in the step (14) and stored sequentially into the code registration memory 811 in the step (16).

When it is judged that the registration has been ended in the step (15), the code data (form information) registered in the code registration memory 811 in the step (17) is preserved in the step (17). Then the flow goes back to the step (1).

On the other hand, when it is decided that data input in the step (1) is not a registration command, it is decided whether the same is a registration reading (call) command in the step (3). If no, it is decided whether the input data is a drawing command in the step (4). If the input data is a drawing command, a composite or pattern is formed by superimposing a second output data (bit-map data) produced from data input by the computer PC with the form pattern (bit-map data) produced from the code data stored in the code registration memory 811 or the form pattern (bit-map data) stored in the image registration memory 812. The form overlay pattern is produced in the memory A806 or B807 in the step (5). Then the flow goes back to the step (1).

On the other hand, if it is decided that data input to the formatter 8 in the step (1) is not a registration command in the step (2), that data is not a registration call command in the step (3), and that data is not a drawing command in the step (4), it is determined whether the data input to the formatter is an image output command in the step (6). If the data is an output command, the form overlay pattern created in the step (5) is output to, for example, at least one of the file unit 5, facsimile unit 4, and printer 2 designated by an external personal computer PC in the step (8). When the form overlay pattern is output to the printer 2, the output image is drawn on a sheet of output paper.

On the other hand, if it is decided that the data is not an output command in the step (6), the same is subjected to another command process in the step (7). Then the flow goes back to the step (1).

Returning to the subject to the first stage, if it is decided that data input to the formatter 8 in the step (1) is not a registration command in the step (2) and that the same is a registration call command in the step (3), it is determined whether the code data has been registered in the step (9). Then, if the decision is that the code data has been registered, the code data registered in the code registration memory 811 in the step (11) is analyzed and image data (a form pattern) is drawn in the memory A806 or B807. Then the flow goes back to the step (1).

If the code data is not registered in the step (9), it is judged that the registration has been preserved as an image in the image registration memory 812. In the step (10), the image (form pattern) registered in the image registration memory is transferred to the memory A806 or B807 to be drawn in the step (5), thus being subjected to a registration call process of the registration image data (form pattern).

As described above, the external personal computer selects and registers an overlay data (form information) in a code data format or in an image data (form pattern) format, and then sends a normal drawing command. Thus, information which is formed by superimposing output data created based on the input data input from the personal computer PC with a form pattern can be output. In other words, it is possible to set whether information is to be stored in a code format or in an image format.

[Second overlay registration/output process]

Figure 11B:
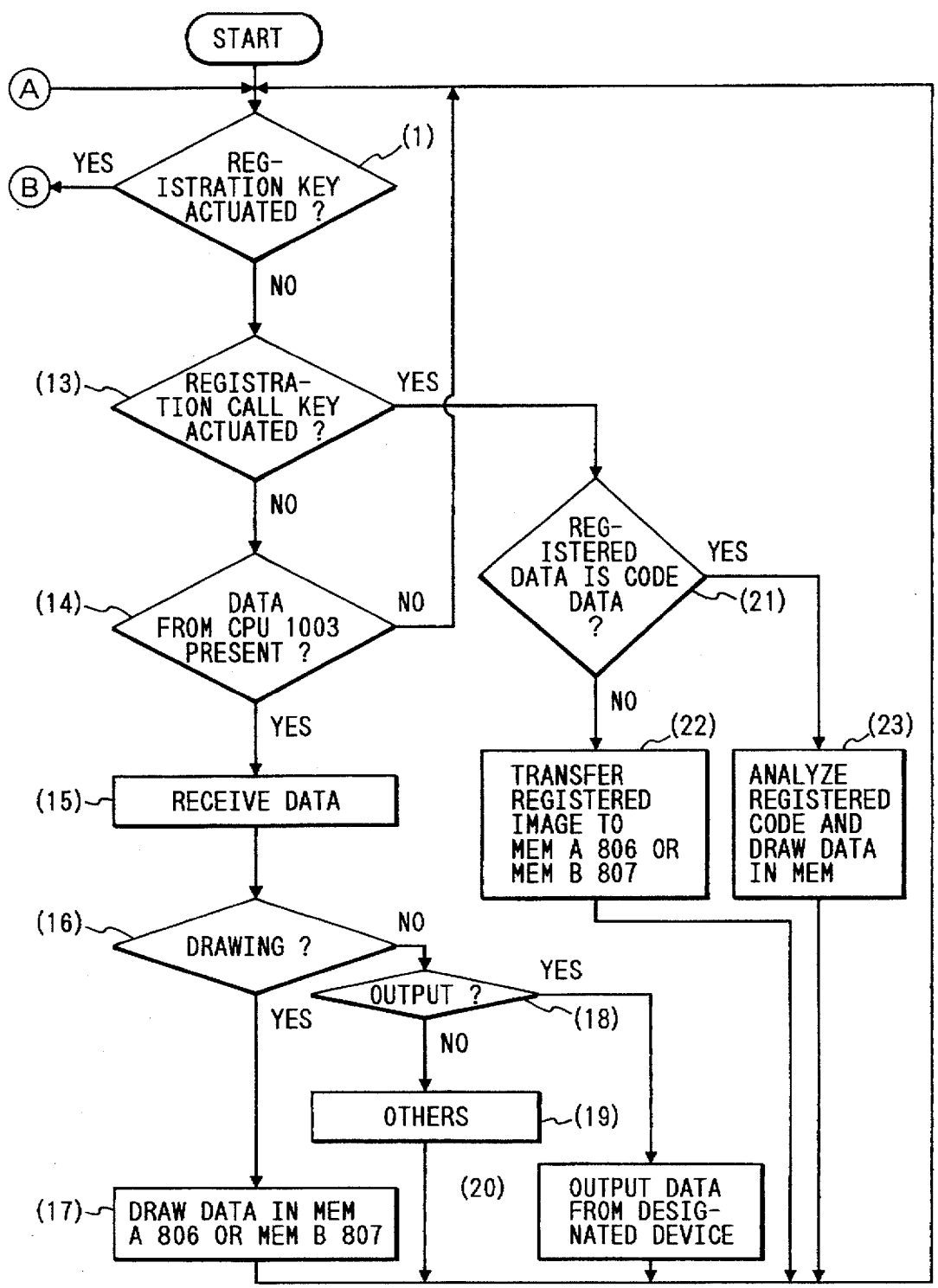
FIG. 11 is comprised of FIGS. 11A and 11B showing flow charts of an example of the second overlay registration/output processing procedure in the image forming system according to the present invention.

FIGS. 11A and 11B are flow charts showing an example of the second overlay registration/output processing procedure in the image forming system according to the present invention. Numerals (1) to (23) represent steps. The flow corresponds to that the operation unit 1125 (with at least a code registration key and an image registration key) built in the printer 2 sets an overlay registration and calling.

After the power source is switched on, the procedure starts. In the step (1), it is decided whether the code registration key or image data registration key has been depressed. When it is decided that either one of the registration keys is depressed, it is determined whether the code registration key or the image data registration key has been depressed in the step (2). When the image data registration key is depressed, until it is determined that the registration end key has been depressed in the step (3), the code data (form information) transferred from the CPU 1003 in the core unit 10 to the formatter 8 is read and translated in the step (5), whereby image data (form pattern) is continuously formed or "drawn".

In the step (3), it is monitored whether the registration end key has been depressed. If NO, it is decided whether there is data which is transferred from the CPU 1003 in the core unit 10 to the formatter 8 in the step (4). If there is no data, the flow goes back to the step (3). If there is data, data is read in the step (5). In the step (6), the drawing process is continued.

On the other hand, when the registration end key is depressed in the step (3), the image data (form pattern) is preserved in the image registration memory 812 in the step (7). Then the flow goes back to the step (1).

If it has been decided that either the code registration key or drawing data registration key has been depressed in the step (1), and it has also been determined that the code registration key was depressed in the step then code data (form information) transferred from the CPU 1003 in the core unit 10 to the formatter 8 in the step (10) is read and stored in the registration memory. Step (10) and step (11) are continued until the registration end key is depressed in the step (8). When the registration end key is depressed in the step (8), code data is preserved in the code registration memory in the step (12). Then, the flow goes back to the step (1).

If it is decided that the registration key has not been depressed in the step (1), it is decided whether the registration call key has been depressed in the step (13). If NO, it is decided whether there is data to be transferred from the CPU 1003 in the core unit 10 to the formatter 8 in the step (14). If there is data, the same is received in the step (15). If the received data is a drawing command in the step (16), a form overlay pattern is drawn in the memory A806 or B807 in the step (17). If the received data is not a drawing command in the step (16) and is not an output command in the step (18), the process is carried out in accordance with the other commands (including registration image erasing command and registration code data erasing command) in the step (19).

On the other hand, when it is decided that data is an output command in the step (18), the form overlay pattern created in the step (17) is output to at least one among the facsimile unit 4, the file unit 5, the image memory unit 9, and the printer 2, designated by the output command in the step (20).

Returning the subject to the first step, if it is decided that the registration key has not been depressed in the step (1), and that the registration call key has been depressed in the step (13), it is decided whether the registration data is code data in the step (21). If the registration data is not code data, image data (form pattern) registered in the image registration memory 812 is transferred to the memory A806 or B807 in the step (22).

When the decision in the step (21) is that the registration data is code data, the code data registered in the code registration memory 811 is translated in the step (23) and then image data (form data) is drawn. Thereafter, the flow goes back to the step (1).

As described above, in the operation unit 1125, the data registration key is depressed in accordance with code data or image to register overlay data (form information) from the external computer connected to the interface unit 7. Thereafter, by depressing the registration call key in the operation unit 1125, the second output pattern created form data input from the external computer is superimposed with the form pattern to form the resultant form overlay pattern, which be drawn and output in the memory A806 or B807. In the other words, the panel device can selectively store the overlay (form information) in code format or in image format.

[Third overlay registration/output process]

Figures 12, 12A:
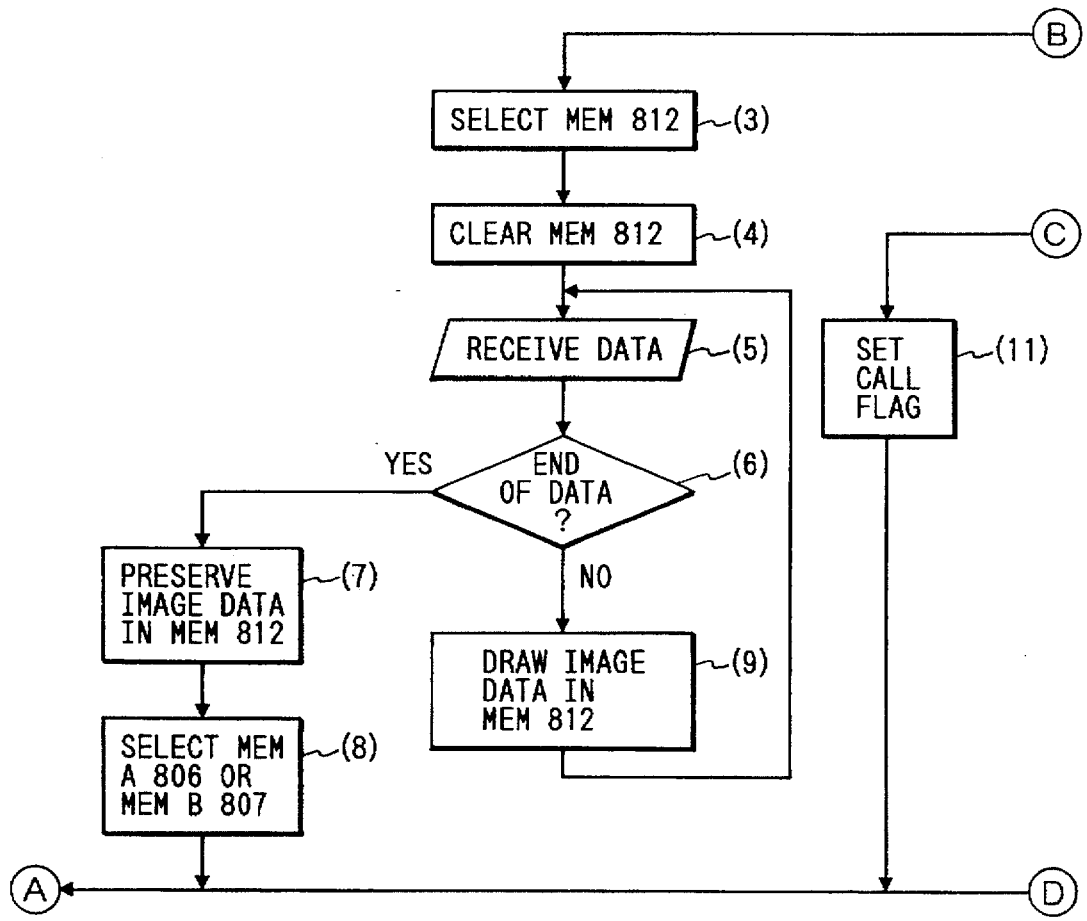
FIG. 12 is comprised of FIGS. 12A and 12B showing flow charts of an example of the third overlay registration/output processing procedure in the image forming system according to the present invention.

FIGS. 12A and 12B are flow charts showing an example of the third overlay registration/output processing procedure in the image forming system according to the present invention. Numerals (1) to (20) represent steps. Of the overlay registrations according to the first overlay registration/output process command, the process regarding the image registration command corresponds to the computing process by hardware. Particularly, only the process regarding the image registration command and the call command will be described here.

The formatter 8, which has previously plural drawing areas for registration image and normal drawing areas, can output a logical sum of the outputs.

When data transferred from the CPU 1003 in the core unit 10 to the formatter 8 is received in the step (1), it is decided that the data is a registration start command or a registration end command in the step (2). If YES, the image registration memory 812 is selected in the step (3) and is cleared in the step (4). The code data which is transferred to the image registration memory 812 in the step (9) in the step (6), and transferred from the CPU 1003 in the core unit 10 to the formatter unit 8 is analyzed. Then the image data (form information) is drawn.

When the data is decided to be a registration data end command in the step (6), image data (form data) is preserved in the image registration memory 812 in the step (17). The memory A806 or B807 is selected in the step (8). Then the flow goes back to the step (1).

When the data which is transferred from the CPU 1003 in the core unit 10 to the formatter 8 is received in the step (1), and it is decided that the data is neither a registration start or registration end in the step (2), it is decided whether the data is a registration call command in the step (10). If it is decided that the data is a registration call command, a call flag is set in the step (11). Then the flow goes back to the step (1).

The data which is transferred from the CPU 1003 in the core unit 10 to the formatter 8 is received in the step (1). If it is decided that the data is neither a registration start or registration end in the step (2) and it is decided that the data is not a registration call command in the step (10), it is decided whether the data is a drawing command in the step (12). If the command is a drawing command, image data (form overlay pattern) is drawn in the memory A806 or B807 in the step (13). Then the flow goes back to the step (1).

When it is decided that the command is not a drawing command in the step (12), it is decided whether the same is an output command in the step (14). If NO, other command is carried out in the step (15). Then the flow goes back to the Step (1). If YES, it is decided whether a call flag has been reset in the step (16). If YES, the output composite function that superimposes the registration image (form pattern) with the output data created based on the input data from the computer is turned ON (step 17). Then, the composite data is output to the device designated in the step (18). Then the call flag is reset in the step (19). In the step (20), the output composite (synthesis) function of superimposing the registration image with the second output data is OFFed. Then the flow goes back to the step (1).

If NO in the step (16), the command is output to the device designated in the step (18). Then the call flag is reset in the step (19) and the output composite function of superimposing the registration image and the output data is turned in the step (20). Finally, the flow goes back to the step (1). According to the above-configuration, the external computer connected to the interface unit 8 draws and registers previously overlay data (form data) and then sends actual drawing command and registration call command for an overlay calling, thus realizing the overlay output (form overlay pattern). That is, an external command can execute the overlay (form) registration and can methodologically overlay or superimpose two image memories.

In this case, the image data registration and the code data registration can be selected, like the first overlay registration/output process.

In order to register externally a data group, the present embodiment includes the means which converts previously code data group (form information) into image data (form data), and stores or registers the result. As a result, the data drawing time can be reduced.

Where a limited memory capacity requires the conventional method which registers a data group (form information) as code data, the registration method can be selected by means of the operation unit or commands. Hence, a registration method suitable for data capacity, the external storage device 6, the image memory 9, or the like can be selected. In the above-embodiments, the form pattern means a repetitive format pattern such as a logo pattern and continuous-form paper.

As described above, according to the first embodiment of the present invention, information can be registered in the form of code data sent from the computer or of converted image data, based on the command instruction from a computer or the operation instruction from the operation means. Hence, the processing time can be reduced at the form overlay outputting time.

Hence, the above registering method allows form information externally input to be set with short time and effectively by means of a simple operation instruction.

What is claimed is:

1. A pattern generating device comprising:

deciding means for deciding whether form information in a code data format input externally is to be registered in a code data format, or whether a form pattern which is created from the form information in the code data format is to be registered, based on form registration information;

registration control means for registering the form information into memory means when said deciding means decides that the form information is to be registered in the code data format, and for creating the form pattern from the form information and then registering the form pattern into said memory means when said deciding means decides that the form pattern is to be created from the form information; and output control means for either (1), if the form information was registered, creating a form pattern based on the form information in the code data format registered in said memory means, superimposing the form pattern with a second pattern to form a form overlay image, and then outputting the composite form overlay image, or (2), if the form pattern was registered, for superimposing the form pattern registered in said memory means with the second pattern to form the form overlay image and outputting the form overlay image, the second pattern being created from data input externally.

2. The pattern generating device according to claim 1, wherein said form registration information is input from a host computer to said pattern generating device.

3. The pattern generating device according to claim 1, wherein said form registration information is input from an operation unit in the pattern generating device.

4. The pattern generating device according to claim 1, wherein said form information is input from a host computer to the pattern generating device.

5. The pattern generating device according to claim 1, wherein said input data is formed of character codes.

6. The pattern generating device according to claim 1, wherein the second pattern is bit-map data.

7. The pattern generating device according to claim 1, wherein said pattern formed by overlaying said form pattern with the second pattern is sent to a printer.

8. A pattern generating method comprising:

deciding whether form information in a code data format input externally is to be registered in a code data format, or whether a form pattern which is created from the form information in the code data format is to be registered, based on form registration information;

registering said form information into a memory when said deciding step decides that the form information is to be registered in the code data format, and for creating the form pattern from the form information and then registering the same into the memory when said deciding step decides that the form pattern is to be created from the form information and to register the form pattern; and if the form information was registered, creating a form pattern based on the form information in the code data format registered in the memory, superimposing the form pattern with a second pattern to form a form overlay image, and then outputting the form overlay image, or, if the form pattern was registered, for superimposing the form pattern registered in the memory with the second pattern to form the form overlay image and outputting the form overlay image, the second pattern being created from data input externally.

9. The pattern generating method according to claim 8, wherein said form registration information is input from a host computer to said pattern generating device.

10. The pattern generating method according to claim 9, wherein said form registration designation information is input from an operation unit of the pattern generating device.

11. The pattern generating method according to claim 9, wherein said form information is input from a host computer to the pattern generating device.

12. The pattern generating method according to claim 9, wherein said input data is formed of character codes.

13. The pattern generating method according to claim 9, wherein the second pattern is bit-map data.

14. The pattern generating method according to claim 9, further comprising the step of sending said pattern formed by overlaying a form pattern with the second pattern to a printer.

* * * * *

UNITED STATES PATENT AND TRADEMARK OFFICE
CERTIFICATE OF CORRECTION

PATENT NO. : 5,729,638
DATED : March 17, 1998
INVENTOR(S) : HIROSHI SUMIO ET AL.

Page 1 of 4

It is certified that error appears in the above-identified patent and that said Letters Patent is hereby corrected as shown below:

COLUMN 2

Line 8, "unit" should be deleted and
        "output" should read --second--.

COLUMN 3

Line 29, "complete a" should read --completion of--; and
    Line 46, "2," should read --2--.

COLUMN 4

Line 57, "SUB.CPU" should read --SUB CPU--.

COLUMN 5

Line 46, "a 8-bit" should read --an 8-bit--;
    Line 49, "SUB-" should read --SUB--;
    Line 50, ".CPU" should read --CPU--;
    Line 59, "a 8-bit" should read --an 8-bit--; and
    Line 60, "input" should read --is input--.

COLUMN 7

Line 46, "a 8-bit" should read --an 8-bit--.

COLUMN 8

Line 15, "a 8-bit" should read --an 8-bit--; and
    Line 18, "a 8-bit" should read --an 8-bit--.

UNITED STATES PATENT AND TRADEMARK OFFICE
CERTIFICATE OF CORRECTION

PATENT NO. : 5,729,638

DATED : March 17, 1998

INVENTOR(S) : HIROSHI SUMIO ET AL.

It is certified that error appears in the above-identified patent and that said Letters Patent is hereby corrected as shown below:

COLUMN 9

Line 13, "each which" should read --each of which--;
Line 16, "which" should read --of which--; and
Line 27, "form" should read --from--.

COLUMN 12

Line 13, "of the any" should read --of any--;
Line 25, "transmits" should read --transmit--; and
Line 37, "stored any" should read --stored in any--.

COLUMN 13

Line 19, "sequentially it," should read
    --it sequentially--;
Line 39, "duplicate explanation" should read
    --explanation of this operation--; and
Line 52, "Where devices" should read --Devices--.

COLUMN 15

Line 18, "data that" should read --data, that--; and
Line 26, "pattern" should read --pattern of--.

COLUMN 17

Line 37, "determined" should read --determines--
    and "registration" should read --registration,--;
Line 52, "pattern" should read
    --form overlay pattern--; and
Line 53, "data" should read --pattern--.

UNITED STATES PATENT AND TRADEMARK OFFICE
CERTIFICATE OF CORRECTION

PATENT NO. : 5,729,638

DATED : March 17, 1998

INVENTOR(S) : HIROSHI SUMIO ET AL.

It is certified that error appears in the above-identified patent and that said Letters Patent is hereby corrected as shown below:

COLUMN 18

Line 16, "drawn" should read --"drawn" and stored--;
Line 39, "that" should be deleted;
Line 40, "image" should read --image data--; and
Line 41, "sets" should read --that sets--.

COLUMN 19

Line 2, "step" should read --step (2)--;
Line 5, "memory." should read --memory 811.--;
Line 47, "form" should read --from--;
Line 50, "which be" should read --which can be--;
Line 51, "the other" should read --other--; and
Line 65, "previously" should read --previously output--.

COLUMN 20

Line 18, "start or" should read --start nor--.
Line 45, "OFFed." should read --turned off.--;
Line 51, "turned" should read --turned off--;
Line 52, "above-configuration" should read
--above configuration--;
Line 54, "previously" should read --previous--; and
Line 64, "previously" should read --previous--.

COLUMN 21

Line 7, "above-embodiments" should read
--above embodiments--.

UNITED STATES PATENT AND TRADEMARK OFFICE
CERTIFICATE OF CORRECTION

PATENT NO. : 5,729,638
DATED : March 17, 1998
INVENTOR(S) : HIROSHI SUMIO ET AL.

It is certified that error appears in the above-identified patent and that said Letters Patent is hereby corrected as shown below:

COLUMN 22

Line 38, "designation" should be deleted.

Signed and Sealed this

Twenty-second Day of December, 1998

Attest:

BRUCE LEHMAN

Attesting Officer

Commissioner of Patents and Trademarks